US006353840B2

United States Patent
Saito et al.

(10) Patent No.: US 6,353,840 B2
(45) Date of Patent: *Mar. 5, 2002

(54) USER-DEFINED SEARCH TEMPLATE FOR EXTRACTING INFORMATION FROM DOCUMENTS

(75) Inventors: Takashi Saito, Sagamihara; Yasushi Abe; Tsukasa Kochi, both of Yokohama, all of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/133,699

(22) Filed: Aug. 13, 1998

(30) Foreign Application Priority Data

Aug. 15, 1997 (JP) .............................. 9-220426
Oct. 7, 1997 (JP) .............................. 9-274244

(51) Int. Cl.[7] .............................. G06F 17/21
(52) U.S. Cl. .............................. 707/517; 707/4; 382/305
(58) Field of Search .............................. 707/517, 4, 5, 707/515; 358/403; 382/176, 180, 305, 306

(56) References Cited

U.S. PATENT DOCUMENTS

| 5,499,366 A | * | 3/1996 | Rosenberg et al. ............ 707/4 |
| 5,664,109 A | * | 9/1997 | Johnson et al. ................ 705/2 |
| 5,717,940 A | * | 2/1998 | Peairs ........................ 707/515 |
| 5,751,286 A | * | 5/1998 | Barber et al. ................ 345/348 |
| 5,802,534 A | * | 9/1998 | Hatayama et al. .......... 707/530 |
| 5,835,922 A | * | 11/1998 | Shima et al. ................ 707/522 |
| 5,845,288 A | * | 12/1998 | Syeda-Mahmood ......... 707/102 |
| 5,873,080 A | * | 2/1999 | Coden et al. ................. 707/3 |
| 5,960,448 A | * | 9/1999 | Reichek et al. ............. 707/526 |
| 5,970,483 A | * | 10/1999 | Evans ........................... 707/3 |
| 5,999,664 A | * | 12/1999 | Mahoney et al. ............ 382/305 |
| 6,002,798 A | * | 12/1999 | Palmer et al. .............. 382/176 |
| 6,016,146 A | * | 1/2000 | Beer et al. .................. 345/349 |
| 6,035,308 A | * | 3/2000 | Yano et al. .................. 707/501 |
| 6,115,717 A | * | 9/2000 | Mehrotra et al. ........... 707/102 |
| 6,128,102 A | * | 10/2000 | Ota ........................... 358/403 |
| 6,137,483 A | * | 10/2000 | Kiyono et al. ........... 707/500.1 |
| 6,272,489 B1 | * | 8/2001 | Rauch et al. .................. 707/4 |

* cited by examiner

Primary Examiner—Joseph H. Feild
(74) Attorney, Agent, or Firm—Knoble & Yoshids, LLC

(57) ABSTRACT

The document processing system includes a database generation unit for generating predetermined bases from documents and a user-defined search template generation unit for generating a user-defined search template which is used to extract a predetermined set of information from substantially similar documents. The user-defined search templates are efficiently generated without any intervention from a technical support personnel.

21 Claims, 25 Drawing Sheets

| ELEMENT NAME | COORDINATES | INDENTATION | FONT SIZE | FONT TYPE | NO. OF LINES | ... |
|---|---|---|---|---|---|---|
| TYPE | (1967,315,2804,372) | RIGHT | 56 | REGULAR | 1 | ... |
| DATE | (2203,419,2792,476) | RIGHT | 56 | REGULAR | 1 | ... |
| TO | (315,503,612,556) | LEFT | 52 | REGULAR | 2 | ... |
| FROM | (2123,619,2940,684) | RIGHT | 56 | REGULAR | 3 | ... |
| TITLE | (867,811,2244,878) | CENTERED | 68 | REGULAR | 2 | ... |
| ABST | (311,1007,2700,1180) | NOT CLEAR | 60 | REGULAR | NONE | ... |

FIG.15

USER-DEFINED SEARCH TEMPLATE FOR EXTRACTING INFORMATION FROM DOCUMENTS

FIELD OF THE INVENTION

The current invention is generally related to a user-defined search template for extracting information from documents, and more particularly related to a method and a system for generating a document template based upon a user selection of divided document image areas.

BACKGROUND OF THE INVENTION

It is generally difficult to extract textual information from non-formatted documents primarily containing alphanumeric characters. Since the documents do not have the exactly identical format, to extract certain information such as a tile from similarly formatted documents, at least a relative location in each document has to be determined. In order to efficiently extract the textual information of the same type from sufficiently similar documents, text image must be first divided into areas and a relevant area then must be identified. In other words, sufficiently similar documents each have the corresponding text image areas where desired information is to be found. To specify the text image areas, predetermined information is generally stored as search templates or extraction criteria.

Prior art attempts in specifying the search templates or the extraction criteria include structural data and extraction rules, The structural data generally accounts for absolute or relative positional relations of textual image areas while the extraction rules determine a priority when more than one textual image areas are found for a search key. For example, Japanese Patent Publication Hei 5-159101 discloses an elaborate scheme for constructing and maintaining an extraction criteria database for extracting textual elements or textual image areas. The database is organized to maintain logical as well as positional relationships among the textual elements and textual image areas in a specific type of a document.

Other prior art attempts include Japanese Patent Publication Hei 8-287189 which discloses an extraction rule for prioritizing candidates to determine a desired textual image area. For example, candidates for a text image area containing a title are prioritized by finding whether any of the candidate areas is centered with respect to the width of the page. The above described extraction rule is predetermined and stored in an extraction dictionary.

The above exemplary prior art disclosures indicate a predetermined dictionary concept for storing the search templates or extraction rules in a system. These information is generally document-specific. In other words, for a new type of document, the specific information must be generated and inputted. Since the above prior art systems are not designed to allow an end-user to generate and input new search templates or extraction rules, more efficient system and process are desired for adding the search templates or extraction rules for a new document.

SUMMARY OF THE INVENTION

In order to solve the above and other problems, according to a first aspect of the current invention, a method of generating a search template for retrieving information from documents, including: inputting a first document; dividing the first document into areas, the areas including a text area containing text and an image area containing an image; displaying the areas to an end user; selecting at least one of the areas based upon an user-defined input, the user-defined input including a label for the selected area; automatically determining a predetermined set of characteristics of the selected area; and storing the user-defined input and the characteristics as a part of the search template.

According to a second aspect of the current invention, a system for generating a search template for retrieving information from documents, including: an input unit for inputting a first document; an area dividing unit connected to the input unit for dividing the first document into areas, the areas including a text area containing text and an image area containing an image; a user selection unit connected to the area dividing unit for displaying the the areas to an end user and for selecting at least one of the areas based upon an user-defined input; and a characteristic extraction unit connected to the user selection unit for automatically extracting a predetermined set of characteristics for the selected areas; and a storage unit connected to the user selection unit and the characteristic extraction unit for storing the predetermined characteristics and the user-defined input as a part of the search template.

According to a third aspect of the current invention, a recording medium containing a computer program for generating a search template for retrieving information from documents, the computer program including the steps of: inputting a first document; dividing the first document into areas, the areas including a text area containing text and an image area containing an image; displaying the areas to an end user; selecting at least one of the areas based upon an user-defined input; providing a predetermined set of user-defined input for the selected areas, the user-defined input including a label for the selected areas; storing the predetermined set of the user-defined input and the characteristics as a part of the search template; inputting a second document which is sufficiently similar to the first document after the storing step; and retrieving information from the second document based upon the specified user-defined input and the characteristics.

According to a fourth aspect of the current invention, A recording medium containing a computer program for generating a search template for retrieving information from documents, the computer program including the steps of: inputting a first document; dividing the first document into areas, the areas including a text area containing text and an image area containing an image; displaying the areas to an end user; selecting at least one of the areas based upon an user-defined input; providing a predetermined set of user-defined input for the selected areas, the user-defined input including a label for the selected areas; storing the predetermined set of the user-defined input and the characteristics as a part of the search template; inputting a second document which is sufficiently similar to the first document after the storing step; and retrieving information from the second document based upon the specified user-defined input and the characteristics.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 15 illustrates one example of a search template for the system according to the current invention.

DETAILED DESCRIPTION OF THE PREFERRED EMBODIMENT(S)

Figure 1:
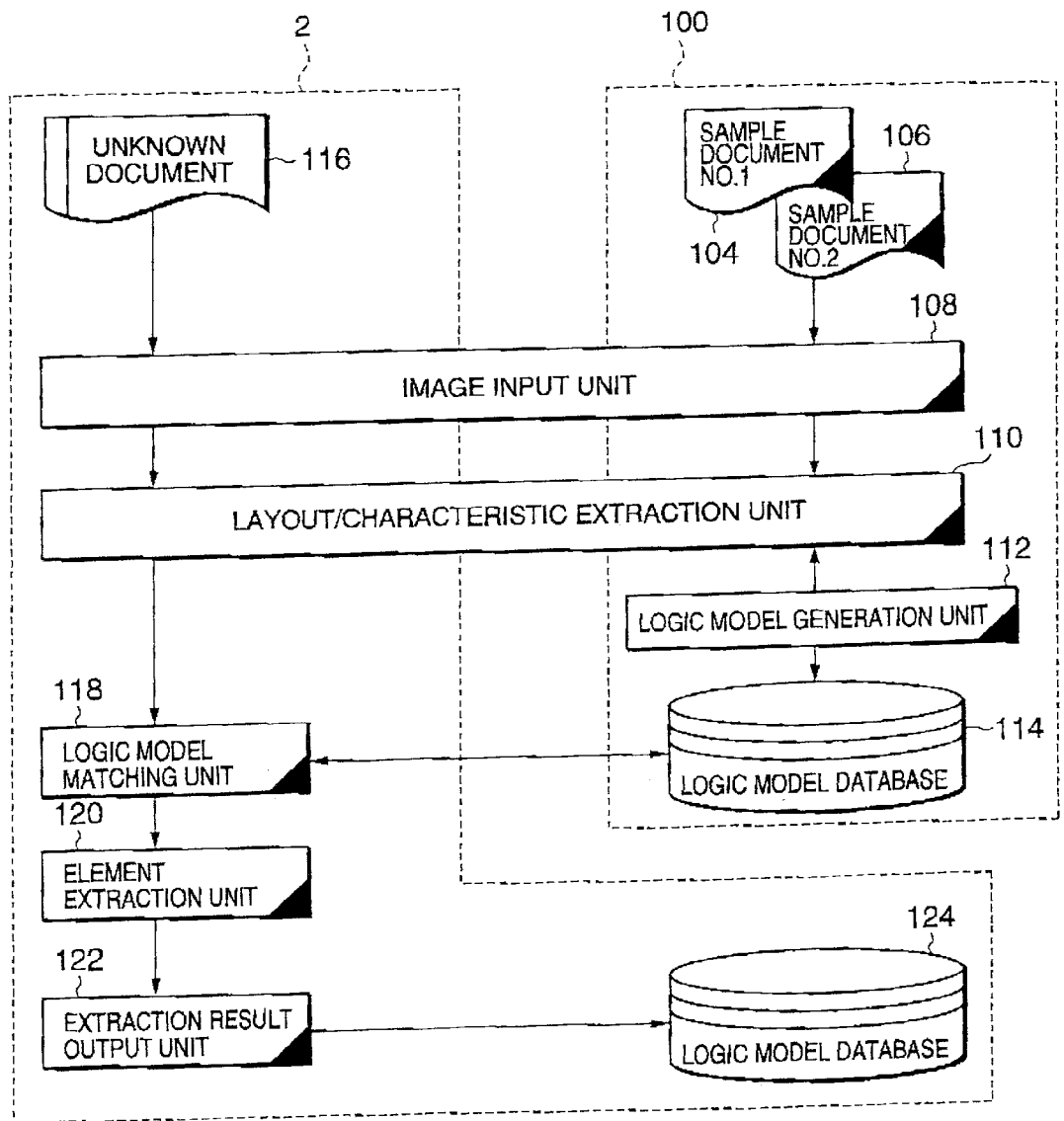
FIG. 1 is a diagram illustrating a concept of the system and the method of generating user-defined search templates according to the current invention.

Referring now to the drawings, wherein like reference numerals designate corresponding structure throughout the views, and referring in particular to FIG. 1, a diagram illustrates a concept of the system and the method of generating user-defined search templates according to the current invention. In general, the right hand side enclosed in a rectangle 100 illustrates a search template generation while the left hand side rectangle 102 illustrates information extraction based upon the search template. A group of known samples such as documents 104 and 106 of a substantially similar type is inputted via an image input unit 108, and a layout/Extraction unit 110 extracts certain predetermined layout/characteristic information. A logic model generation unit 112 generates a logic model or structure based upon a user-selection and stores the model in a logic model database unit 114. A plurality of user-defined search templates is stored for documents of various types or similar types.

Still referring to FIG. 1, an unknown document which is substantially similar to the samples is later inputted via the image input unit 108. After the layout/Extraction unit 110 extracts the information, a logic model matching unit 118 selects an appropriate user-defined search template and extracts elements from the unknown document based upon the selected user-defined search template. An extraction result output unit 122 outputs the relevant information to the document database 124.

Figure 2:
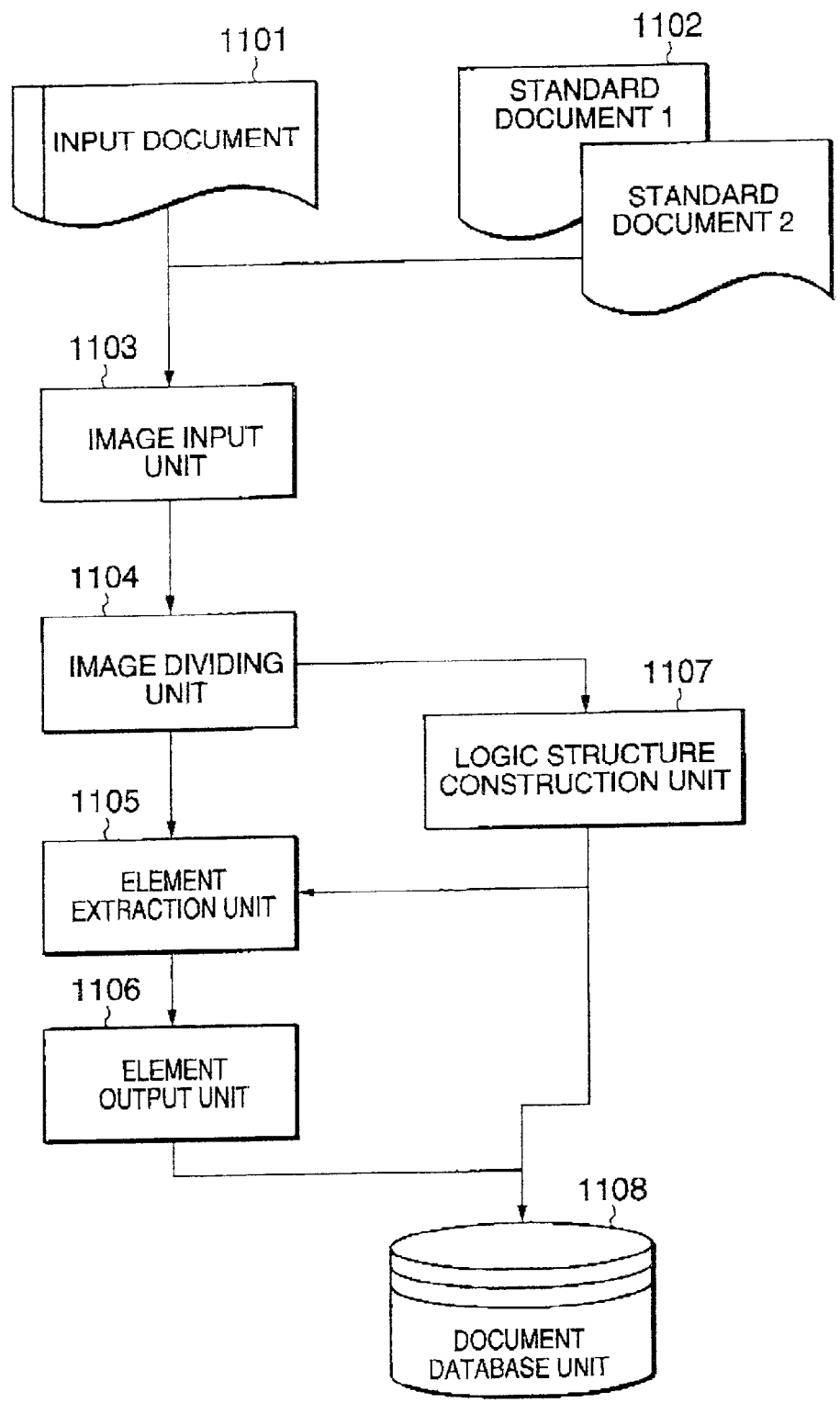
FIG. 2 illustrates one preferred embodiment of the system for generating user-defined search templates according to the current invention.

Referring to FIG. 2, one preferred embodiment of the system for generating user-defined search templates according to the current invention extracts information from documents and includes an image input unit 1103, an image dividing unit 1104, an element extraction unit 1105, a logic structure construction unit 1107, an element output unit 1106 and a document database unit 1108. The image input unit 1103 inputs standard documents 1102, and the image dividing unit 1104 divides the inputted document image into minimally circumscribed rectangular sub-areas. The logic structure construction unit 1107 allows a user to select the divided areas where desired information is contained and to provide a user-defined name or label for each of the selected areas. The logic structure construction unit 1107 also extracts associated characteristic information for the selected areas. The selected area characteristic information as well as the user-defined name are stored in the document database unit 1108 as a user-defined search template. The image input unit 1103 inputs an input document and divides into minimally circumscribed rectangular sub-areas. The element extraction unit 1105 retrieves the user-defined search template from the document database unit 1108. Based upon the user-defined search template, the element extraction unit 1105 extracts relevant information from the input document. Finally, the element output unit 1106 outputs the extracted relevant information to the document database unit 1108.

Figure 3:
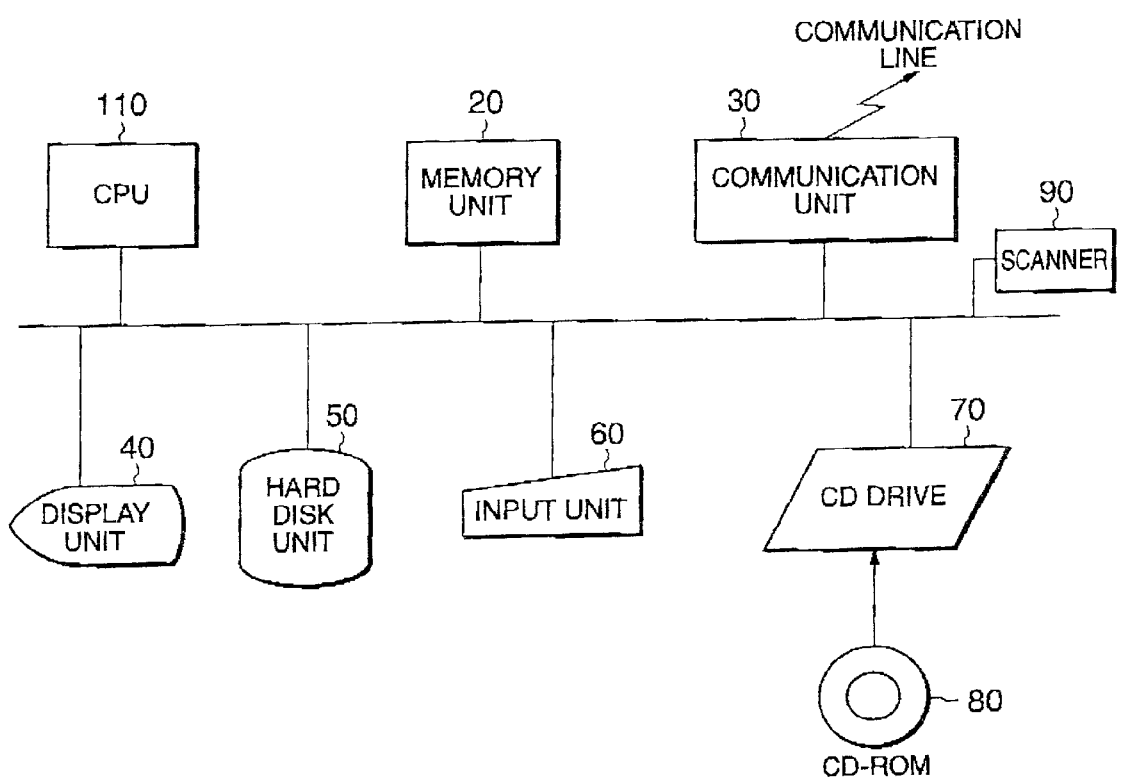
FIG. 3 illustrates a second preferred embodiment of the system for generating user-defined search templates according to the current invention.

Referring to FIG. 3, a second preferred embodiment of the system for generating user-defined search templates according to the current invention extracts information from documents and includes a central processing unit (CPU) 10, a memory unit 20, a communication interface unit 30, a display unit 40, a hard disk unit 50, a user input unit 60, a compact disk (CD) unit 70 and a scanner 90. The CPU runs 10 an application program in the memory unit 20 for generating a user-defined search template and for extracting information from documents based upon the user-defined search template. The documents are either stored in a storage device such as the hard disk unit 50 after they are scanned by the scanner 90 as well as the CD unit 70 and a CD-ROM 80. The documents are also inputted into the system through the communication unit 30 via a communication line. To generate the user-defined search template, the display unit 40 displays a menu from which a user selects elements of the documents via the user-input unit 60. Based upon the selected elements, predetermined information is automatically extracted, and the selected elements and the associated information are stored as a user-defined template.

Figure 4:
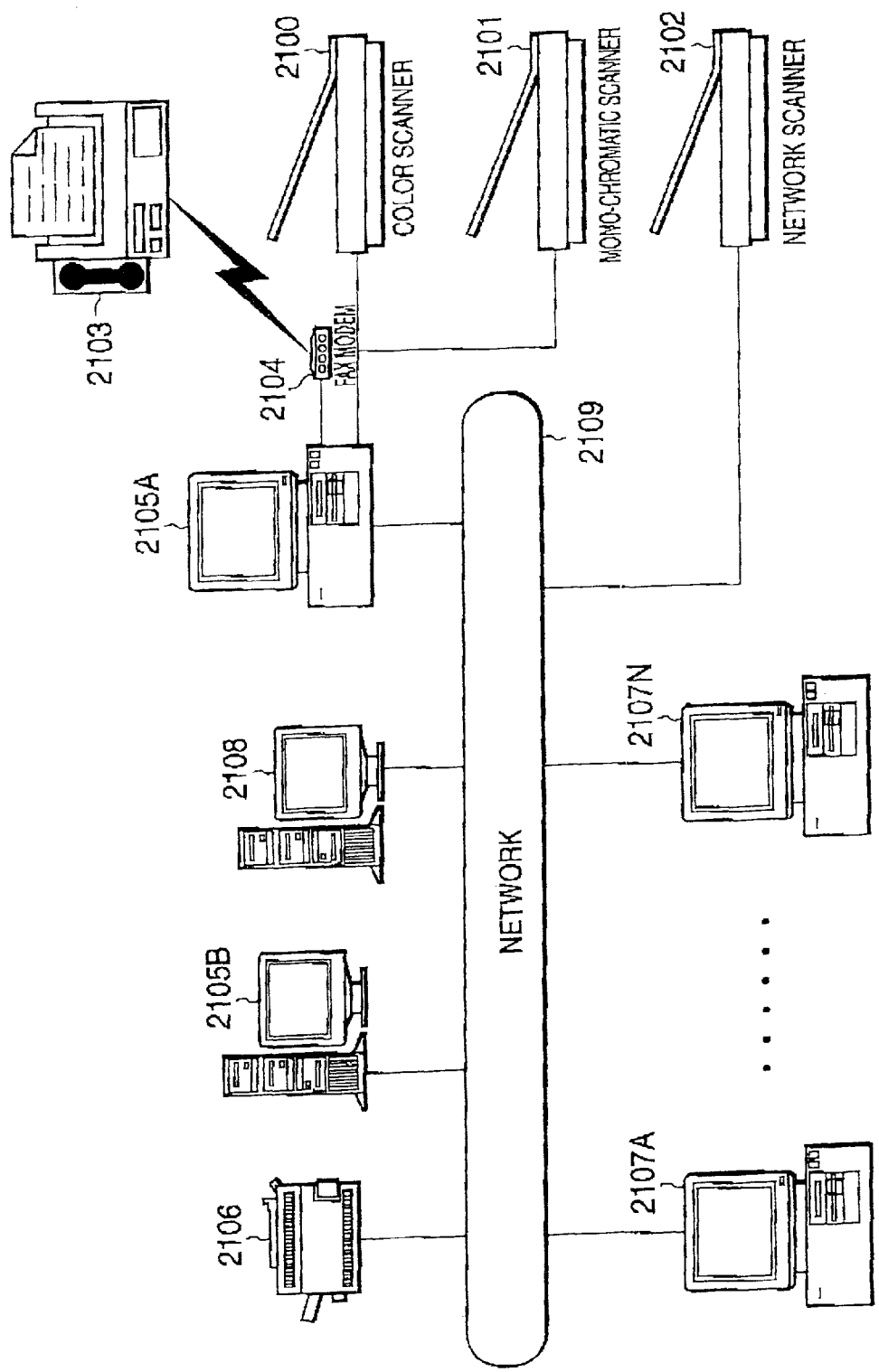
FIG. 4 illustrates a third preferred embodiment of the system in a network environment for generating user-defined search templates according to the current invention.

Referring to FIG. 4, a third preferred embodiment of the system for generating user-defined search templates according to the current invention extracts information from documents in a network environment. A number of client terminals 107*a* through 107*a* as well as document processing servers 105*a*, 105*b* are connected via a network 2109 to input and output devices such as a color scanner 2100, a mono-chromatic scanner 2101 and a network scanner 2102, a facsimile machine 2103 via a fax modem 2104 and a digital multi-function unit 2106. Documents are scanned by the scanners 2100 through 2102 into the network. In the alternative, document data is transmitted into the first document processing server 2105*a* on the network 2109 via the facsimile machine 2103 and the fax modem 2104. The document data includes a document file that is generated by a word processing application program. The digital multi-function machine 2106 also inputs documents, and the second document processing server 2105*b* processes the inputted image. In general, both document processing servers 2105*a* and 2105*b* generate a predetermined database to store the inputted documents. The database facilitates the display and retrieval of relevant information in the stored documents. A search server 2108 handles search/retrieval requests from the client terminals 2107*a* through 2107*n*.

Figure 5:
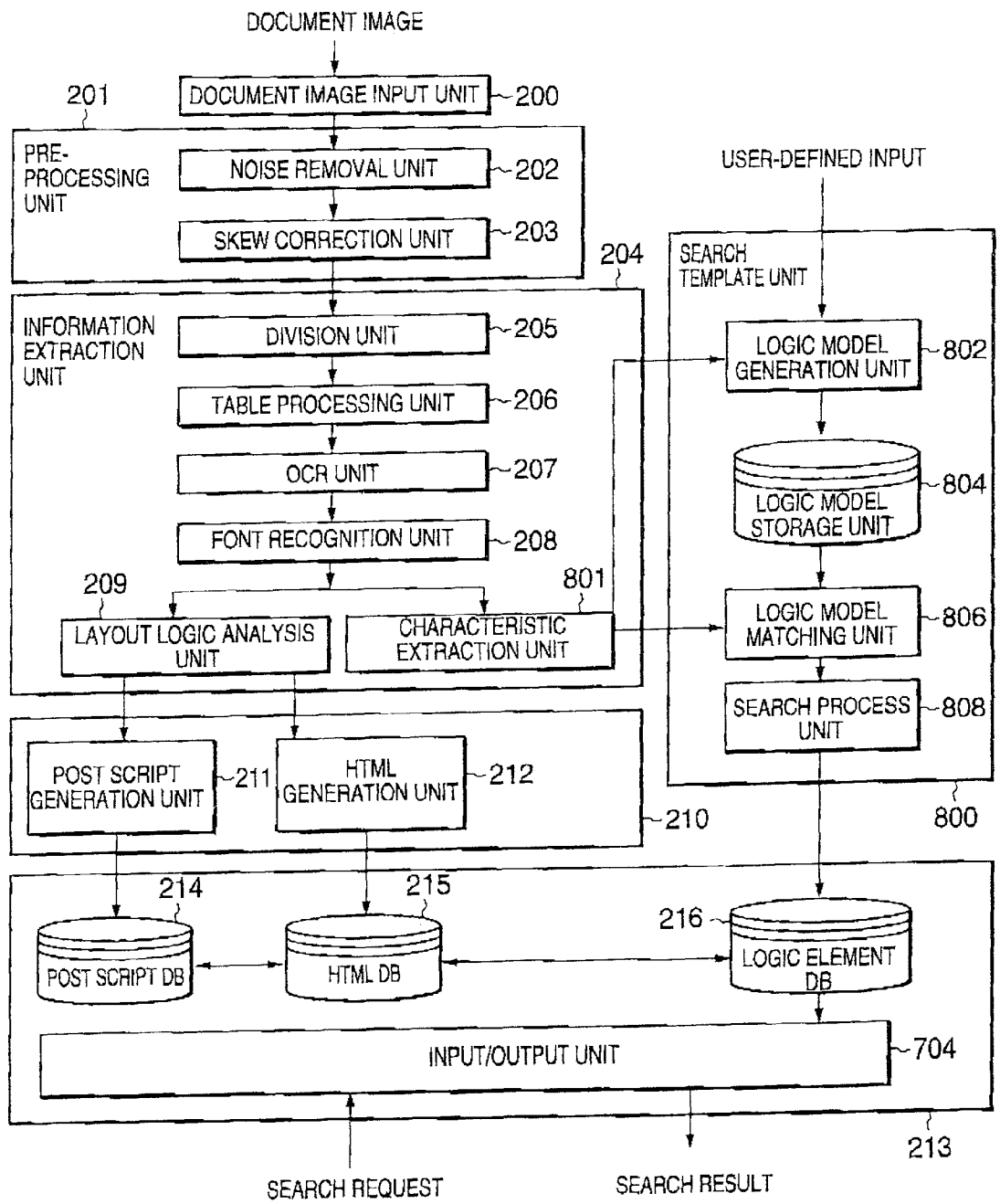
FIG. 5 illustrates a fourth preferred embodiment of the system for generating user-defined search templates according to the current invention.

Now referring to FIG. 5, a fourth preferred embodiment of the system for generating user-defined search templates according to the current invention includes a preprocessing unit 201, an information extraction unit 204, a document database generation unit 210, a database storage unit 213 and a search template unit 800. A document image input unit 200 inputs a document. The pre-processing unit 210 receives document image data from the document image input unit 200 and generally prepares the received data for further processing by the information extraction unit 204. If the received data represents a color image, the pre-processing unit 201 also digitized the image data into binary data. The pre-processing unit 210 further includes a noise removal unit 202 for removing isolated noise and a skew correction unit 203 for correcting the skewed image.

Still referring to FIG. 5, the information extraction unit 204 generally extracts certain information necessary for generating a predetermined database and further includes the following units. In order to extract the predetermined information, a division unit 205 first divides the document image into separate sub-areas which respectively include characters, figures, diagrams, tables and photographs. These sub-areas are each defined by a minimal circumscribing rectangle. If a sub-divided area contains a table, a table processing unit 206 further divides the table into entries in order to isolate characters or numbers. An optical character recognition unit (OCR) 207 converts alphanumeric characters in the character sub-areas into computer recognizable data such as in an ASCII format. A font recognition unit 208 determines the size and type of the optically recognized characters. A layout and logic analysis unit 209 determines a layout pattern such as paragraphs and a columnar arrangement of the document image. The columnar arrangement generally includes a single column, a multi-column or free formatted columns. The information extraction unit also further includes a characteristic extraction unit 801 for extracting information related to logic aspects of the document.

Based upon the information determined by the layout and logic analysis unit 209, the document database generation unit 210 generates a plurality of databases and further includes a post script (PS) document database generation unit 211 and a hyper text markup language (HTML) database generation unit 212. The PS document database generation unit 211 generates document page layout descriptions in a specialized language such as Post Script and stores them in the PS database 214. The document page layout descriptions generally help reproduce the original layout of the document as termed in "WYSIWYG" or "What You See IS What You Get." On the other hand, the HTML database generation unit 212 generates document content structural descriptions in a specialized language such as HTML and stores them in the HTML database 215. The document content structural descriptions generally provide flexible links or connections between text and other document entities such as diagrams. The above use of the specialized languages is exemplary, and other specialized languages include Portable Document Format (PDF), Standard Generalized Markup Language (SGML) and Extensible Markup Language (XML).

Still referring to FIG. 5, the search template unit 800 further includes a logic model generation unit 802, a logic model storage unit 804, a logic model matching unit 806, and a search process unit 808. Based upon an user-defined input and the output from the characteristic extraction unit 801, the logic model generation unit 802 generates a dictionary of search templates and stores them in the logic model storage unit 804. Each of the search templates contains information for extracting user-defined information from a document that is substantially similar to the one from which the search template is generated. For example, a search template specifies to extract "date," "sender" and "recipient" of substantially similar documents. When an unknown document is inputted via the document image input unit 200, the pre-processing unit 201 and the information extraction unit 204 for extracting information, the logic model matching unit 806 selects a most appropriate or the closest search template from the logic model storage unit 804. The search process unit 808 applies the selected search template and extracts the specified information from the inputted document. The extracted information is then stored in the logic element database unit 216.

Independent of the above described information extraction, database generation and search template generation, a search request is independently made via a search I/O unit 704. The search request is made to any combination of the databases 214, 215 and 216. For example, a certain search request is initially made to the logic element database, and then based upon the result of the search, the related element is used to search in other databases.

Figure 6:
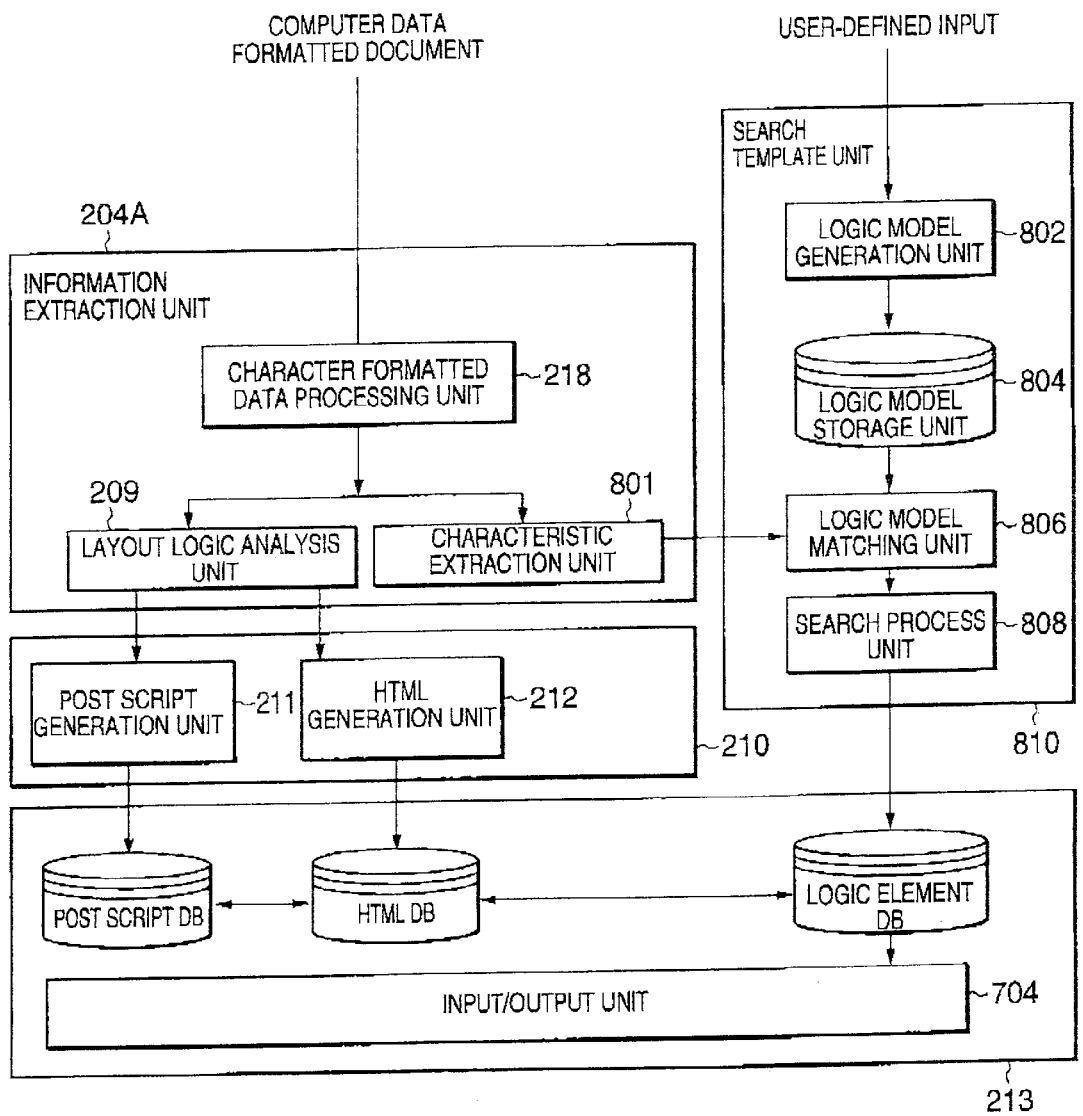
FIG. 6 illustrates a fifth preferred embodiment of the system for generating user-defined search templates according to the current invention.

Now referring to FIG. 6, a fifth preferred embodiment of the system for generating user-defined search templates according to the current invention is illustrated in a diagram. All of the components are substantially identical except for the information extraction unit 204*a* which includes a computer formatted data processing unit 218 and directly receives computer formatted data. For example, the computer formatted data is generated by a word processing application program or a facsimile machine. Since the computer formatted data already includes the font information, rather than determining the font type and size, the information extraction unit 204*a* simply extract the font information from the document data.

Figure 7:
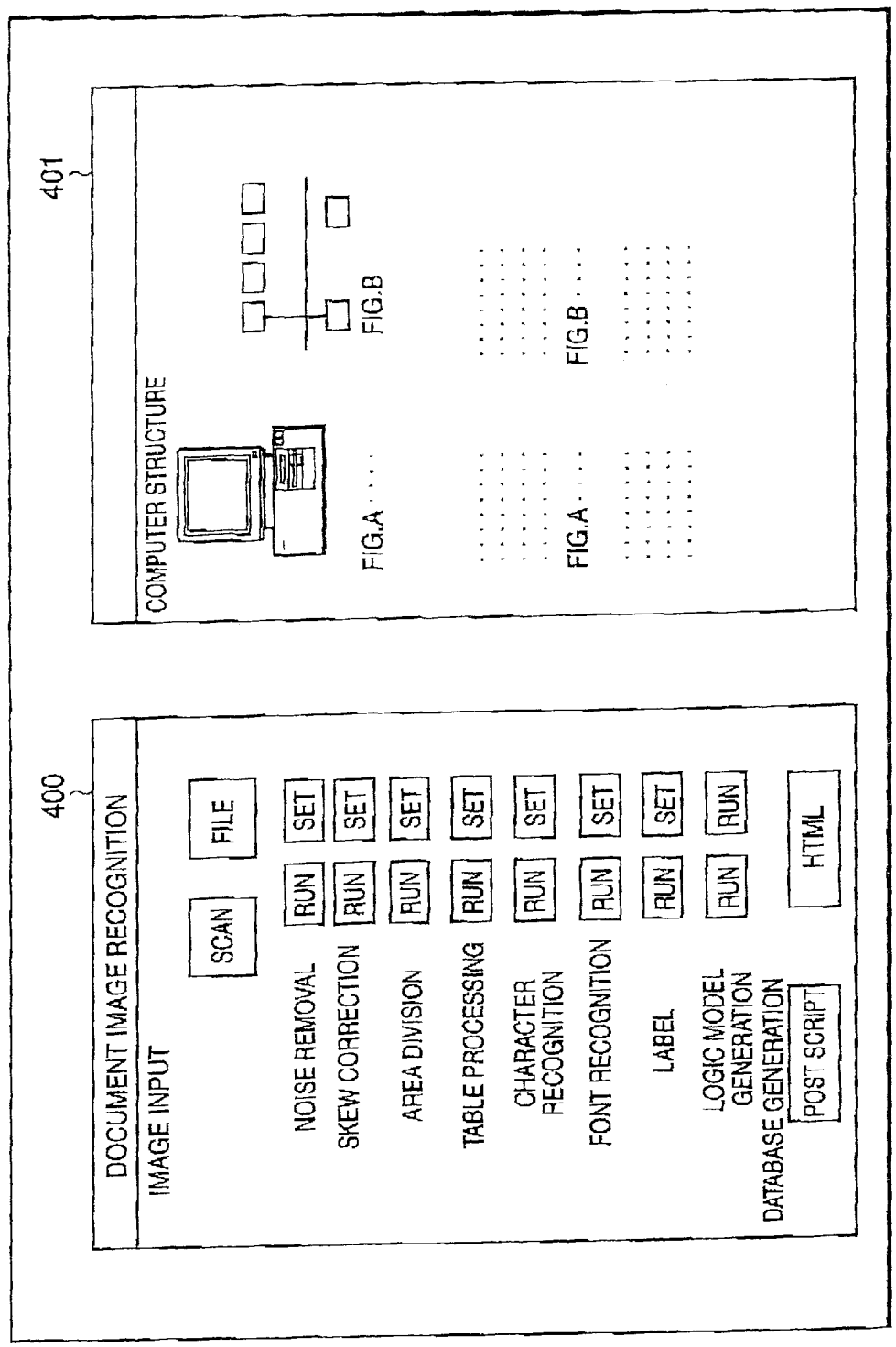
FIG. 7 illustrates one exemplary user interface of one preferred embodiment of the system for generating a search template and databases according to the current invention.

Referring to FIG. 7, one exemplary user interface of one preferred embodiment of the system for generating a search template and databases according to the current invention is illustrated. A right window 401 in the interface displays a document while a left window 400 displays operational controls for processing the document. The operational controls include image input, noise removal, skew correction, area division, table processing, character recognition, font recognition, labeling, logic model generation, and database generation. Each of the operational controls is user-selectable, and any combination of the operations is available. Ultimately, after the selected operations are performed on the input image, selected databases are generated. In an alternative embodiment, a combination of the above described operational controls is predetermined, and no user involvement is required.

Figure 8:
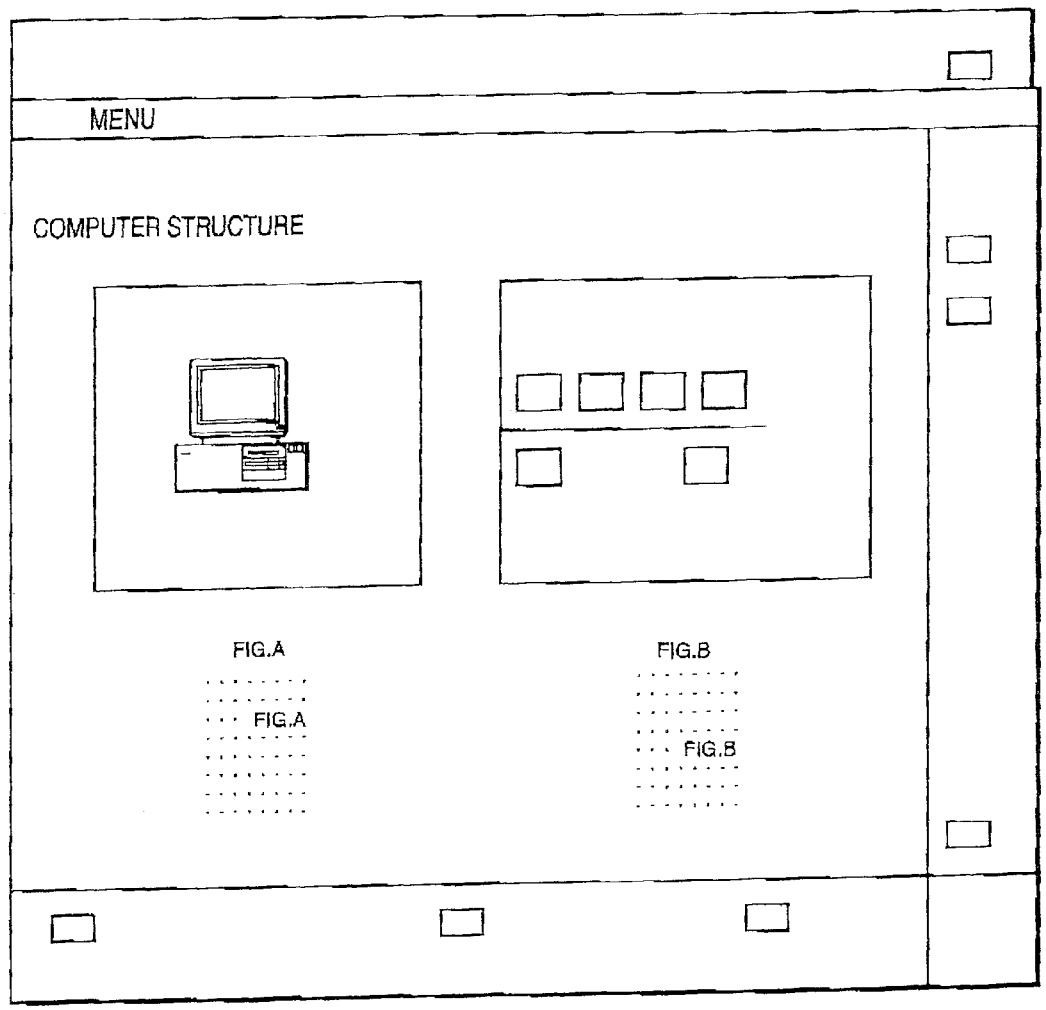
FIG. 8 illustrates a document image which is generated from the Post Script database.
Figure 9:
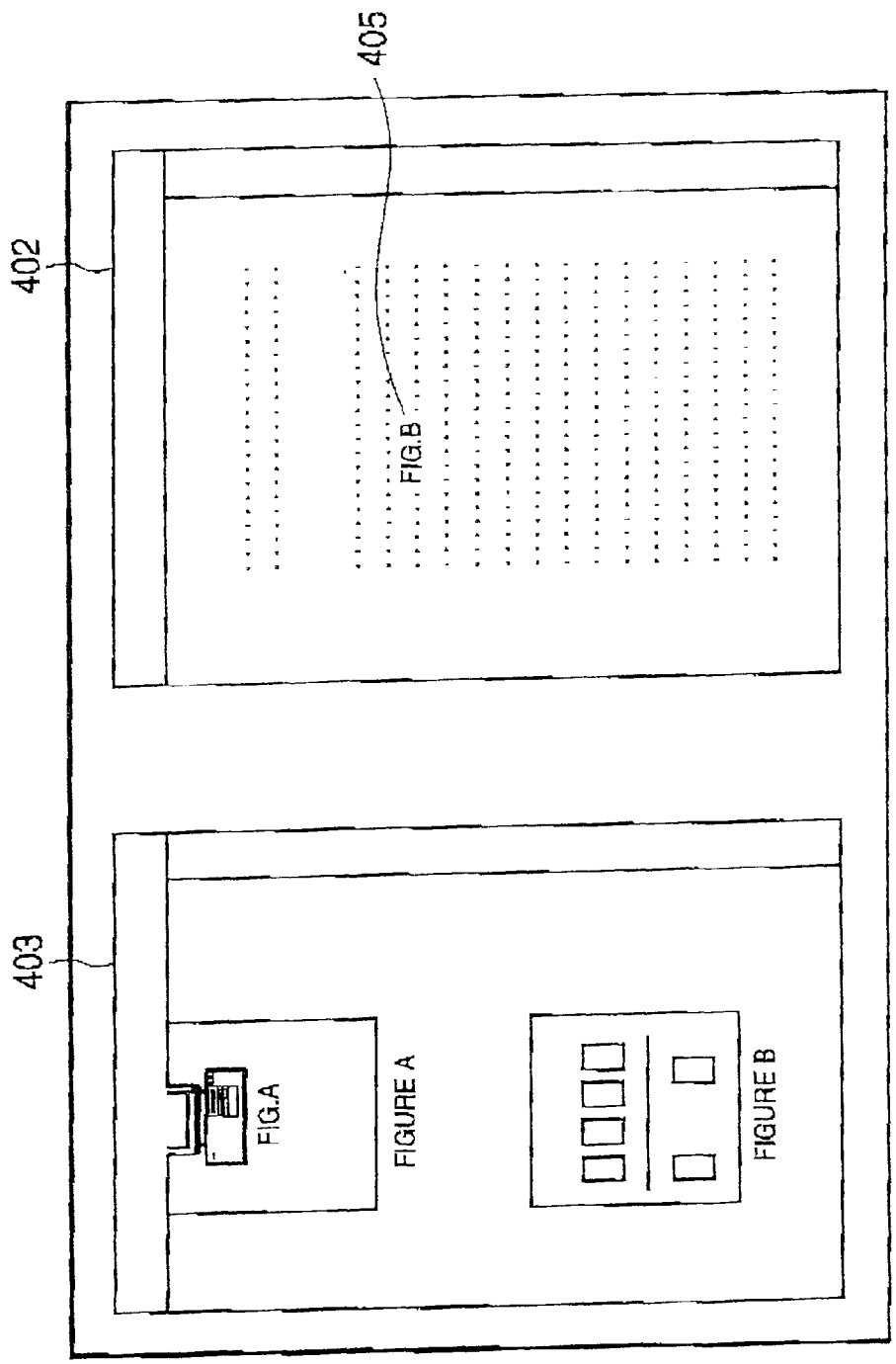
FIG. 9 illustrates a reproduced document image which is generated based upon the Hyper Text Markup Language (HTML) database.

Referring to FIGS. 8 and 9, based upon the above generated databases, the original document is reproduced. In particular, FIG. 8 illustrates a document image which is generated from the PS database. The layout or spatial arrangement of the elements in the original document is maintained in the reproduced image. In other words, in this example, "FIG. A," FIG. A's associated text, "FIG. B and FIG. B's associated text are spatially displayed in a substantially identical manner. On the other hand, FIG. 9 illustrates a reproduced document image which is generated based upon the HTML database. The HTML database does not necessarily maintain the original structural or spatial arrangement of the elements, but it maintains various hyper links between the elements. For example, a right window 402 displays text while a left window independently displays figures and diagrams. In this example, a text area 405 indicated as "FIG. B" is selectable via a mouse, and upon user selection, the corresponding "FIG. B" is automatically scrolled in the left figure window. Thus, based upon the nature of the document, a database generation is selected.

Figure 10:
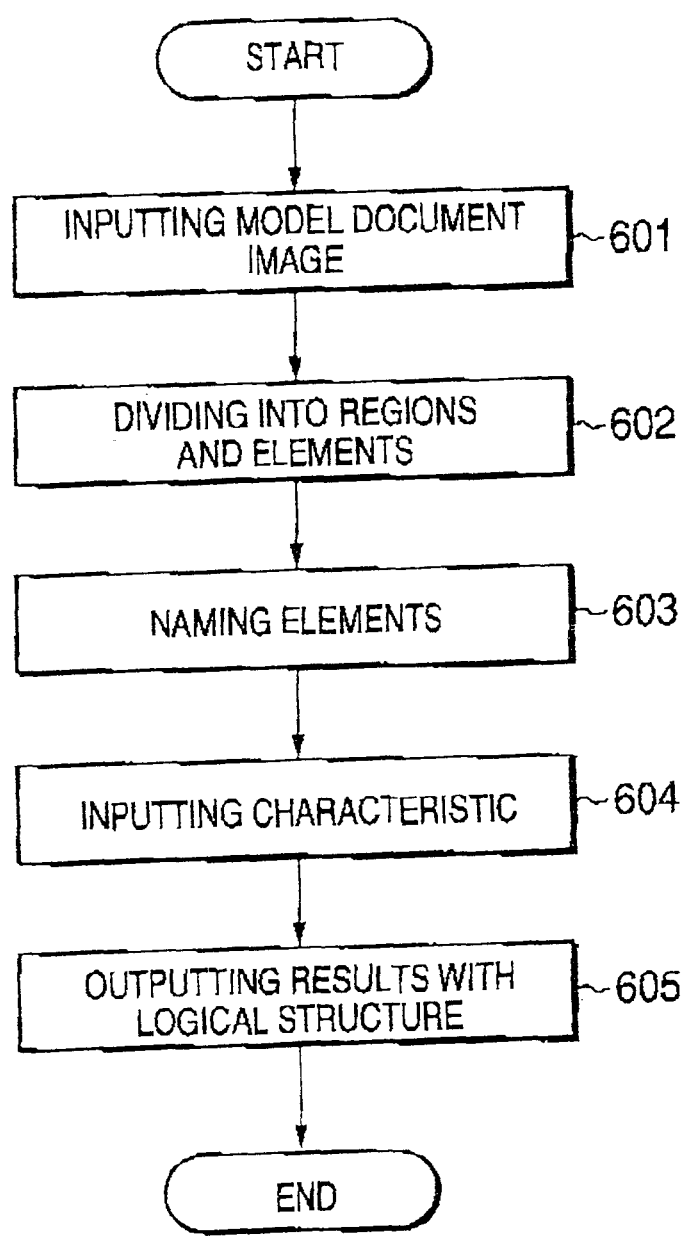
FIG. 10 is a flow chart illustrating steps of a preferred process of generating a search template according to the current invention.

Now referring to FIG. 10, steps of a preferred process of generating a search template according to the current invention are illustrated in a flow chart. In a step 601, a sample document or model document is inputted, and the sample document is a known document from which a search template is generated. In a step 602, the inputted model document image is divided into areas. Each area contains one of the following elements: lines of text, a line of text, a character and non-text areas. The non-text areas generally contain a diagram, a figure, a table or a picture. For each text area, the coordinates of the text area, font information such as a font size and a font type of the characters in the text area, and the layout information such as indentation and columnar arrangement are also collected in the step 602. For each non-text area, the coordinates of the non-text area are determined in the step 602. In a step 603, an end user selects areas that are used as a part of the search template and provides a name or a label for each selected area. In a step 604, the end user further optionally provides certain predetermined characteristics for each selected area. The end user input as well as the above described extracted information are outputted as a search template in a step 605.

Figure 11:
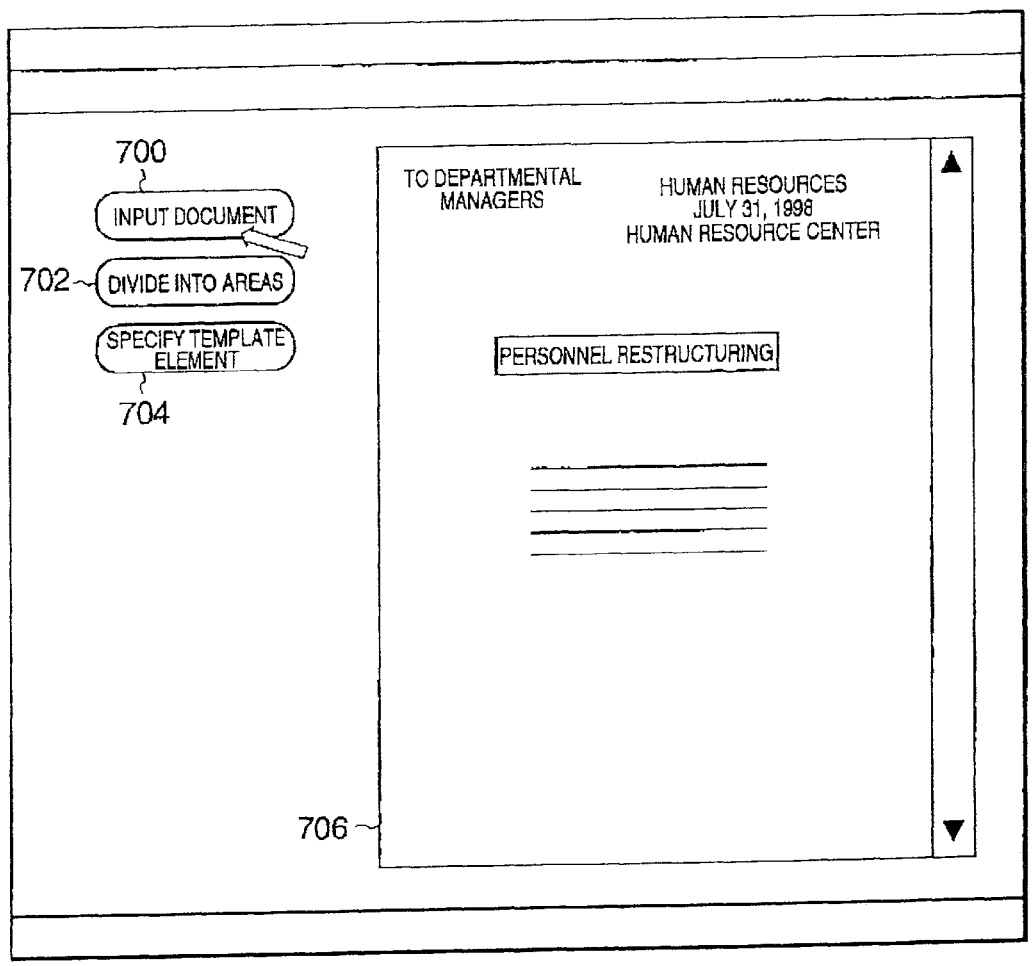
FIG. 11 illustrates an exemplary model document image in a display window.
Figure 12:
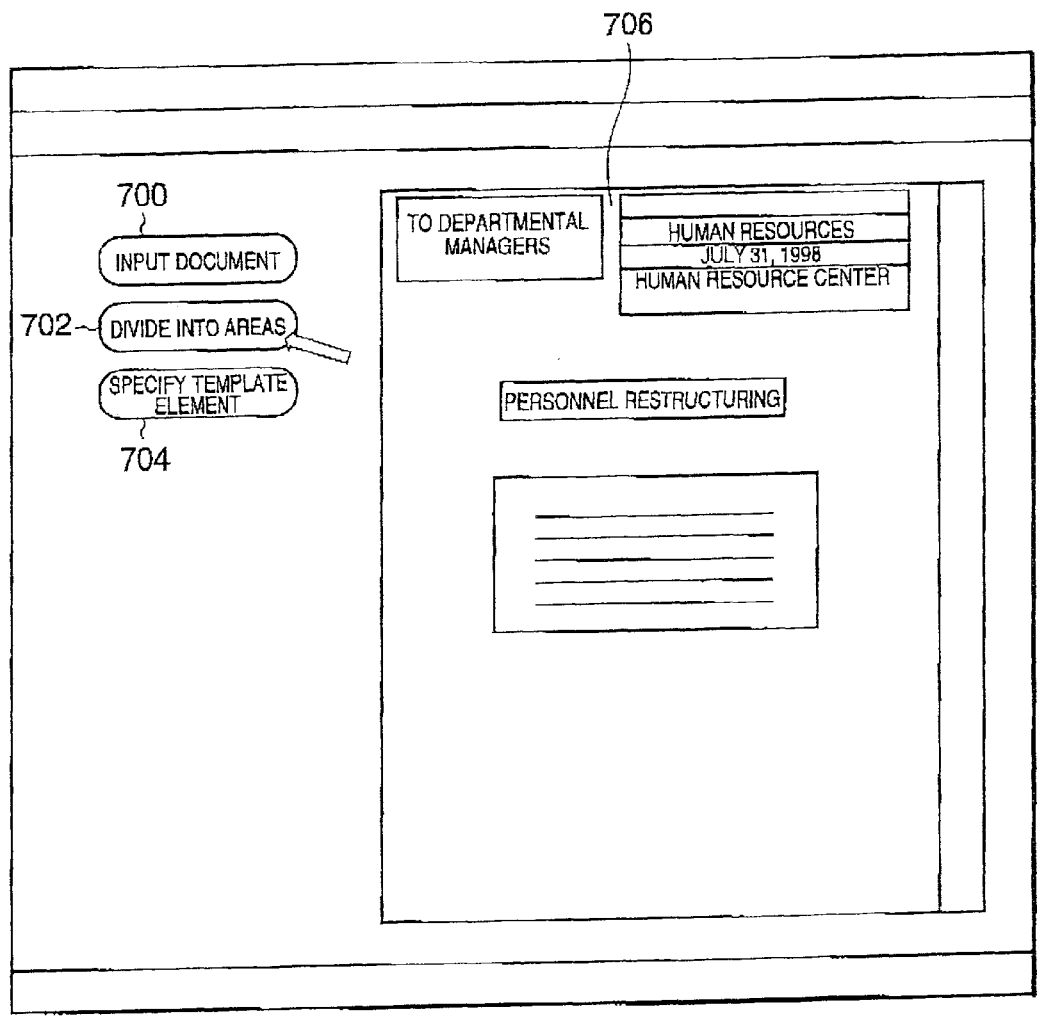
FIG. 12 illustrates the same exemplary model document image which is now divided into areas.
Figure 13:
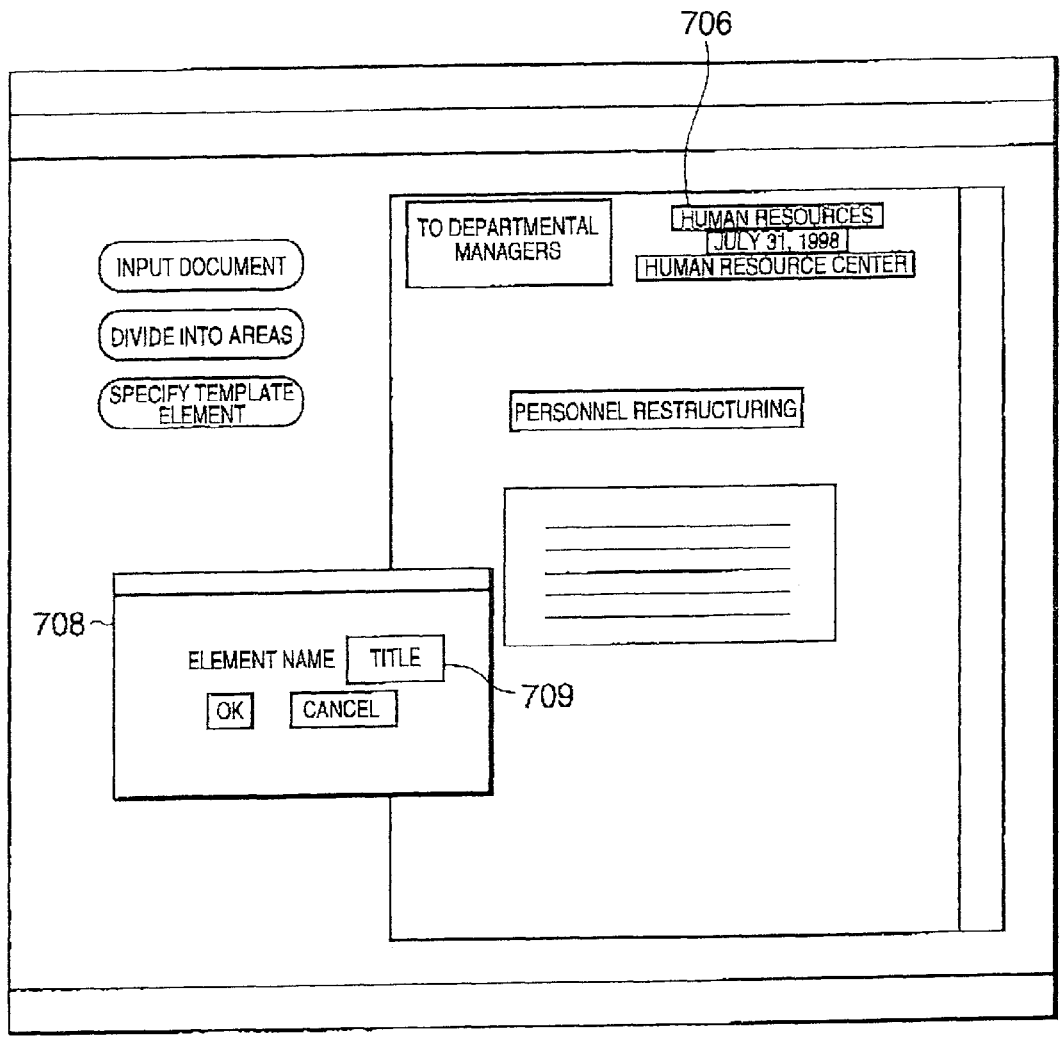
FIG. 13 illustrates that an area is selected as indicated by an arrow head cursor in the display window.
Figure 14:
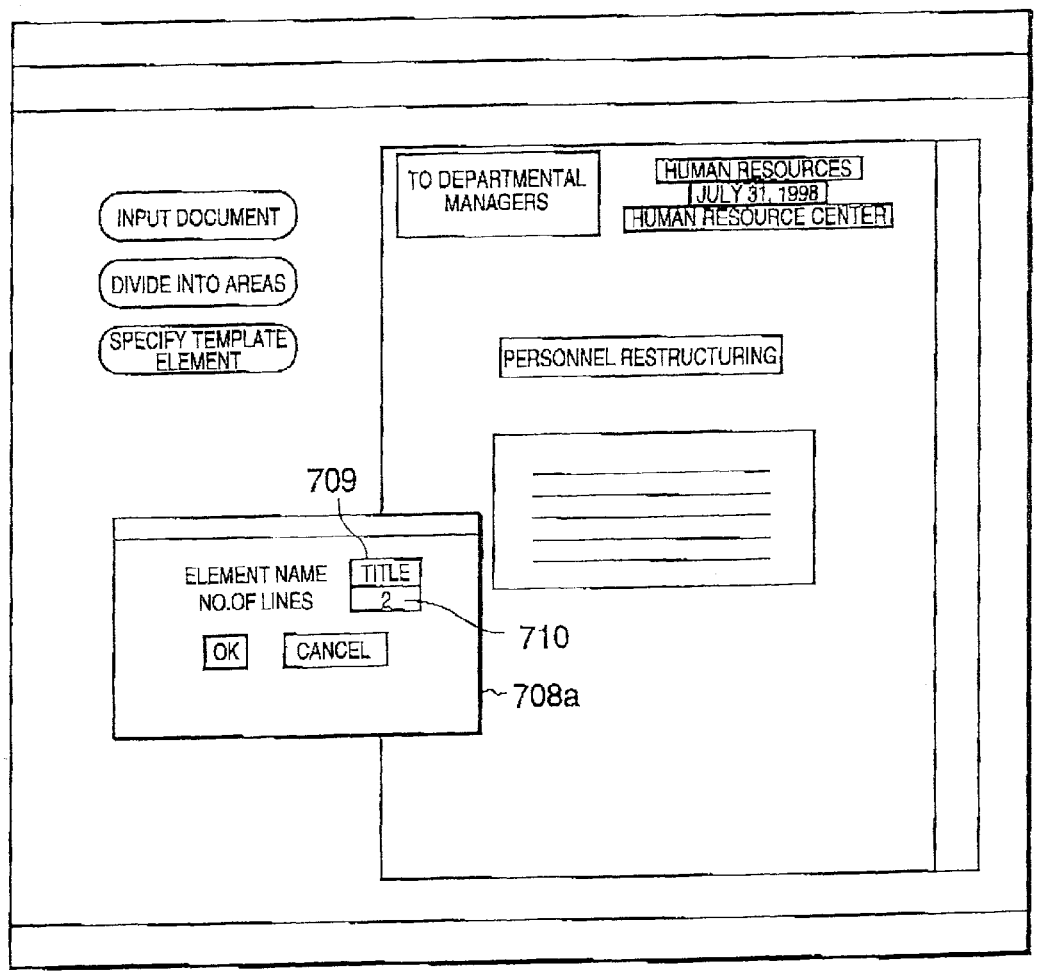
FIG. 14 illustrates an another exemplary user input dialogue box.

To further illustrate the above described steps, referring to FIGS. 11 through 14, one exemplary user interface of one preferred embodiment of the system for generating a search template and databases according to the current invention is illustrated. After the "logical model generation" button as shown in FIG. 7 is selected, the search template generation starts. FIG. 11 illustrates that an exemplary model document image is inputted and displayed in a display window 706 after an input document control button 700 is selected as indicated by an arrow cursor. FIG. 12 illustrates that the same exemplary model document image is now divided into areas after the area division control button 702 is selected. In the display window 706, the document image is divided into minimally circumscribing rectangles. The sender, "Human Resources," recipients, "Departmental Managers," date, "Jul. 31, 1998" as well as a title, "Personal Restructuring" are all separated by the rectangles. Lastly, FIGS. 13 and 14 illustrate the user interface for selecting user-defined elements. In particular, in FIG. 13, an area is selected as indicated by an arrow head cursor in the display window 706. Then, an user input dialogue box 708 automatically appears, and the user is requested to provide a name for the selected area. The user-defined input area 709 accepts the user-defined information "TITLE." Similarly, FIG. 14 illustrates an another exemplary user input dialogue box 708*a* which includes a first user input area 709 for typing a user-defined name for the selected area as well as a second user input area 710 for providing associated characteristic information. That is, a maximum number of lines for the selected title area is inputted by the user. However, such characteristic information is not mandatory, and the dialogue box 708*a* can be closed by pressing an OK button without supplying the information.

FIG. 15 illustrates one example of a search template for the system according to the current invention is illustrated. This exemplary search template includes an user-defined element name, their corresponding coordinates, indentation, font size, font type, as well as no of lines. For example, a minimal circumscribing rectangle for an area including "TITLE" is located at (867, 811, 2244, 878) and is centered. Unlike other databases for managing documents, the above described elements in the search template are independent of each other. Although the user-defined information is limited to a name in this example, in an alternative embodiment, other information is provided by an user.

Figure 16:
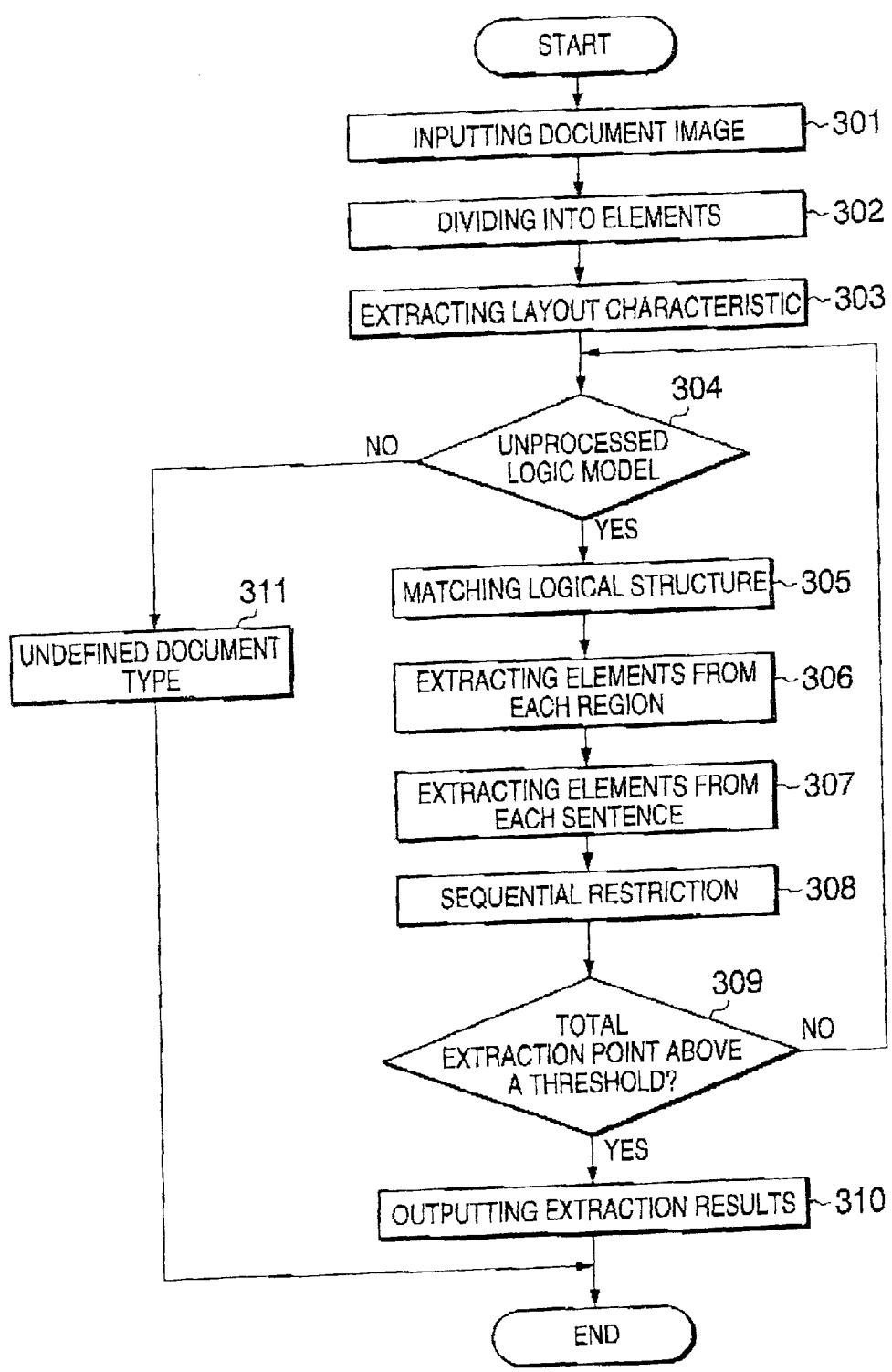
FIG. 16 is a flow chart illustrating steps of another preferred process of extracting information from an unknown document image according to the current invention.

Now referring to FIG. 16, as mentioned before, a plurality of the search plates is generated for various types of documents, and steps are illustrated for another preferred process of extracting information from an unknown document image according to the current invention. In a step 301, an unknown document is inputted, and the inputted document image is divided into areas in a step 302. Predetermined layout characteristic information is extracted in a step 303. It is determined whether or not there is a logic model to which the current input document data has not been compared in a step 304. If there is an unprocessed logic model, in a step 305, the current document data is processed according to the logic model. Areas are extracted according to the logic model in a step 306 while sentence areas are extracted according to the logic model in a step 307. The sentence areas are determined to increase accuracy by possibly correcting wrongly divided areas. For each extracted element, a reliability index is determined, and a total reliability index score or a total extraction point is kept. If necessary, the extracted elements are assigned a sequential number to indicate relative position among the elements in a step 308. The sequential numbers are useful in eliminating an error of extracting the same element more than once when the elements appear in order. Before outputting the extracted information in 310, the total reliability index score is compared to a predetermined threshold value in a step 309. If the total reliability index score is above the threshold value, the extracted elements are outputted in a step 310. On the other hand, if the total reliability index score is not above the threshold value, the above described steps 304 through 310 are repeated with another logic model. When all of the logic models are exhausted and or the total reliability index score fails to exceed the predetermined threshold value, the preferred process proceeds to a step 311 where the current input document is determined to be undefined in the logic model.

Figure 17:
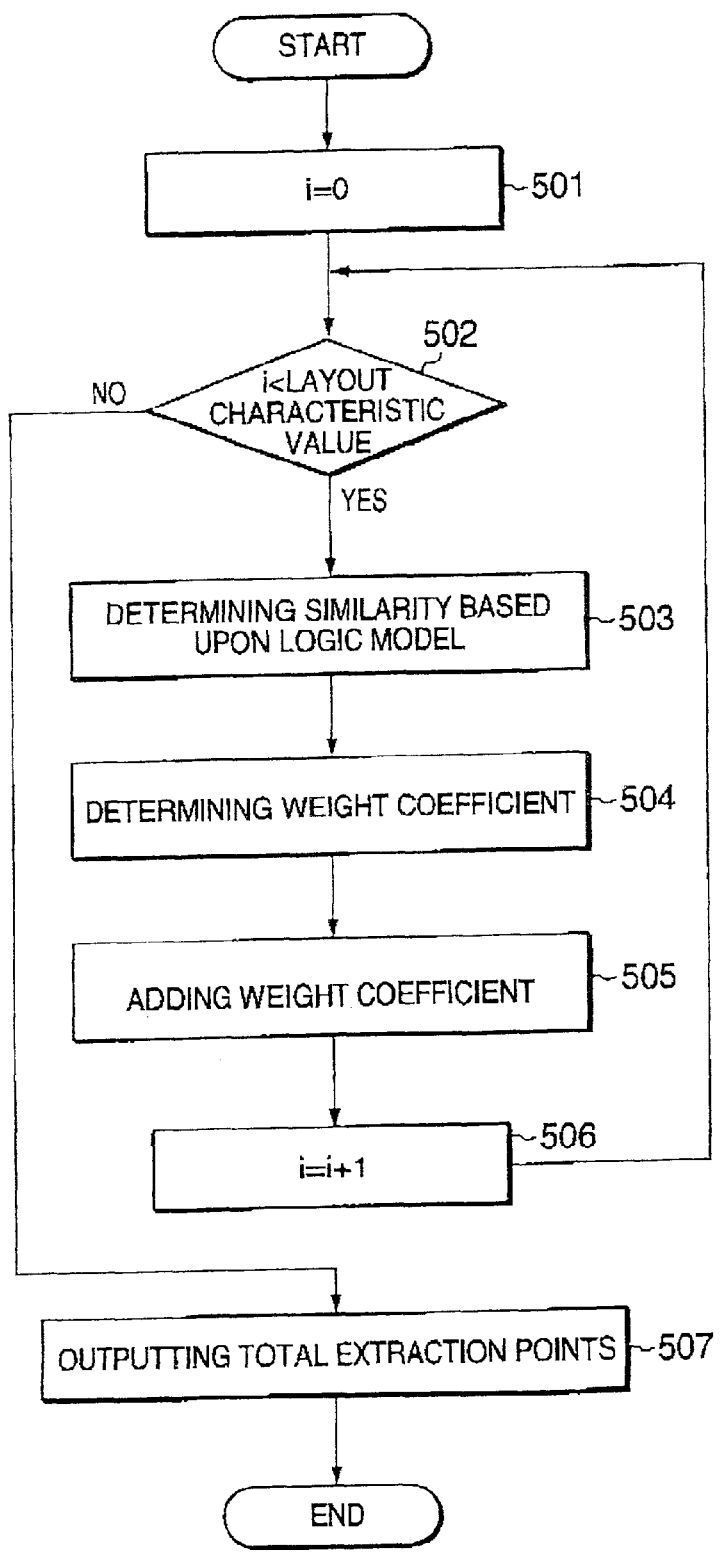
FIG. 17 is a flow chart illustrating steps of a preferred process of determining a total reliability index in generating a search template according to the current invention.

Now referring to FIG. 17, steps of a preferred process of determining a total reliability index in generating a search template according to the current invention are illustrated in a flow chart. In a step 501, a counter "i" is initialized to zero and is compared to a predetermined layout characteristic value in a step 502. If the counter value is smaller than the predetermined layout characteristic value, a similarity value is determined based upon a logic model in a step 503. The similarity value is multiplied by a weight coefficient in a step 505. The weight coefficient allows to modify similarity based upon the reliability of the layout characteristics. The product is added to the total reliability index score. After the step 505, the counter is incremented by one in a step 506, and the steps 502 through 506 are repeated. On the other hand, if the counter exceeds the predetermined layout characteristic value in the step 502, the total reliability index score is outputted.

Figure 18:
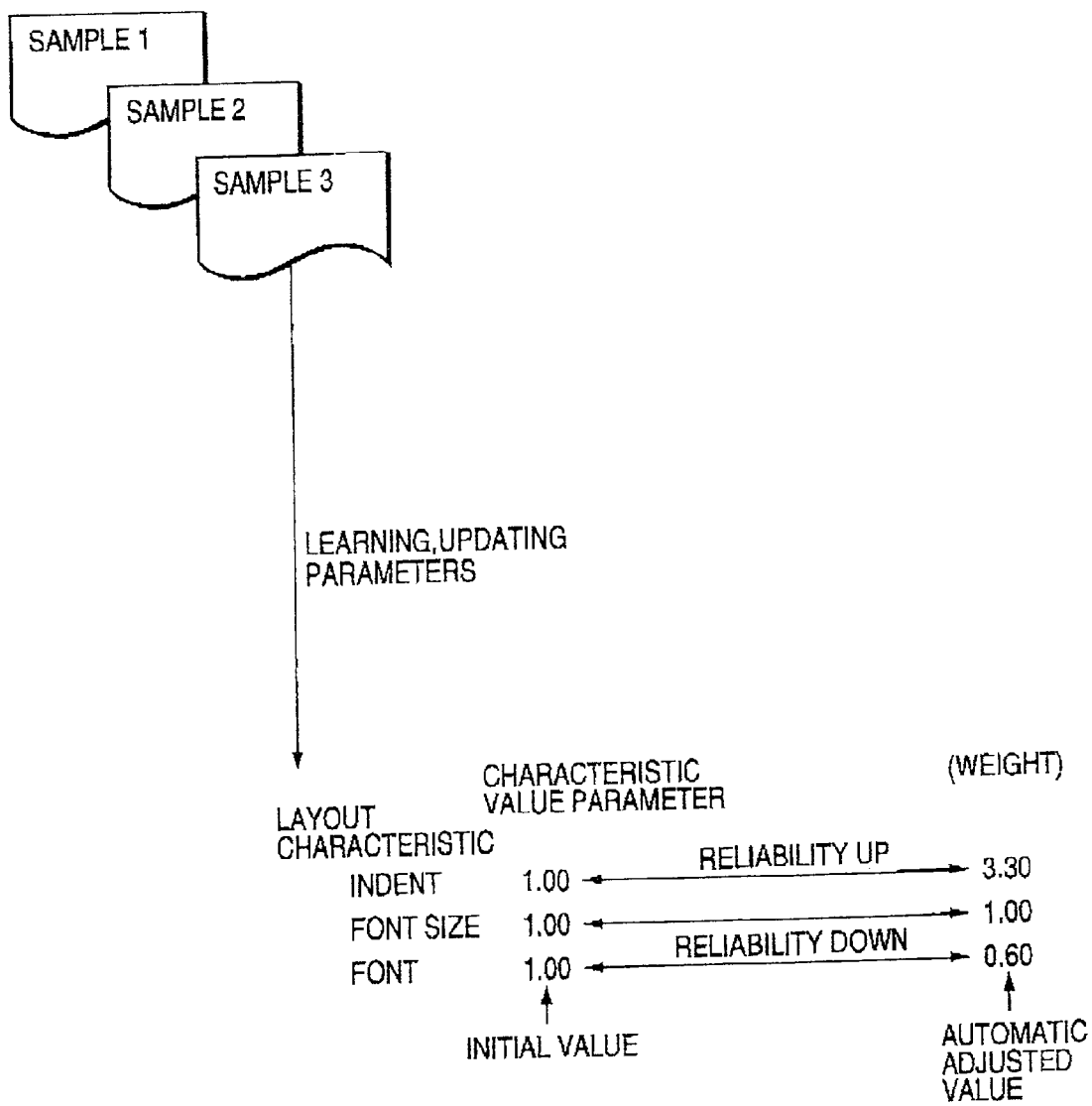
FIG. 18 is a diagram illustrating the above described weight concept for layout characteristics.

Now referring to FIG. 18, the above described weight concept for layout characteristics is further illustrated in a diagram. Sample documents 1 through 3 of a substantially similar and predetermined type are inputted one at a time during the search template learning or fine tuning process. The layout characteristics such as indent, font size and font type are initially set as "1.00" for initial weight or value parameter values. Based upon the reliability of each layout characteristics, for example, indent is considered more reliable than font type. That is, the indent information among the sample documents is more consistently available. Thus, the indent characteristic now has a larger reliability index of "3.30" while the font type characteristics now has a smaller reliability index of "0.60."

Figure 19:
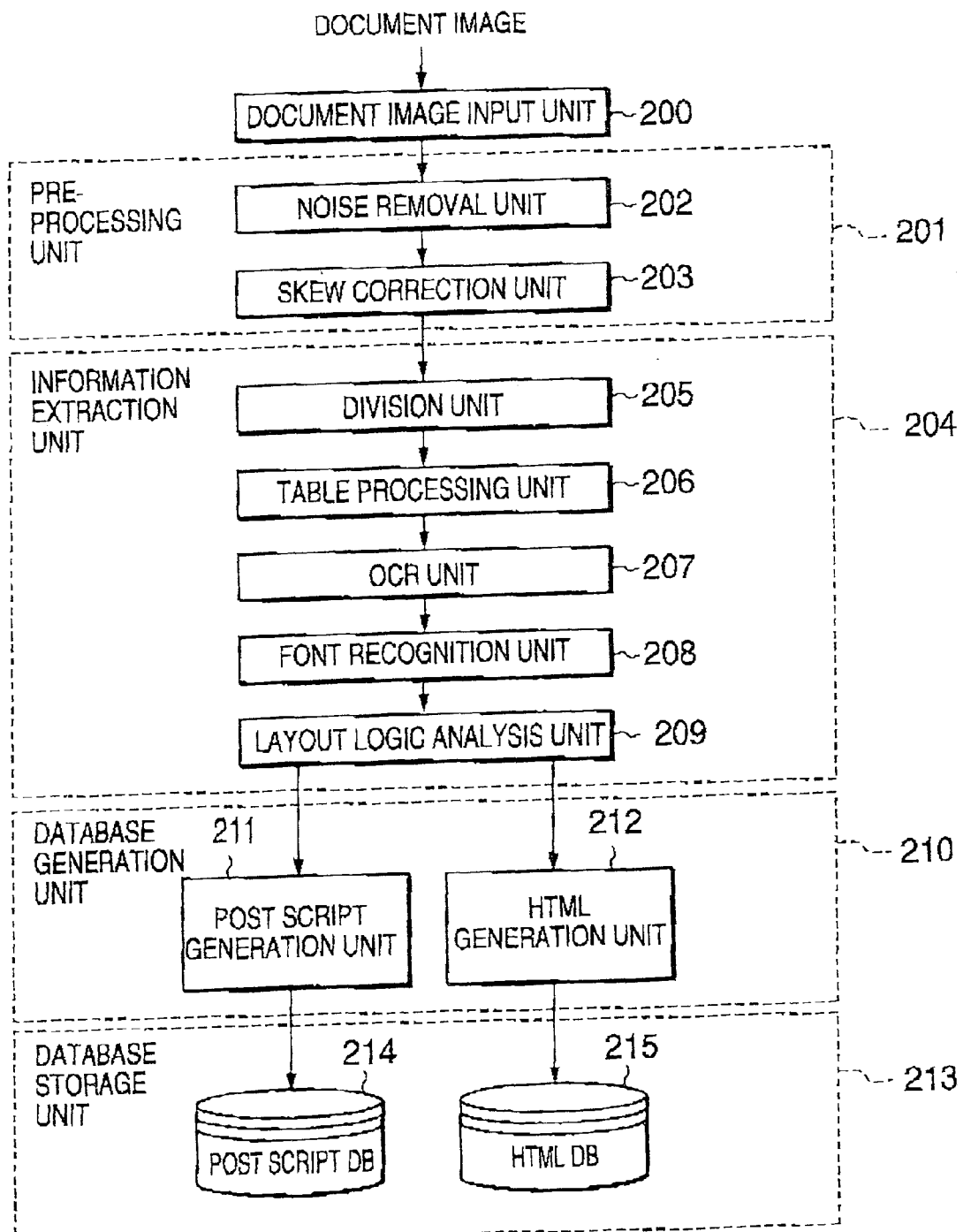
FIG. 19 illustrates a first alternative embodiment of the system for generating user-defined search templates according to the current invention.

Referring to FIG. 19, a first alternative embodiment of the system for generating user-defined search templates according to the current invention is illustrated in a diagram. All of the components of the first alternative embodiment are substantially identical to those of a preferred embodiment as shown in FIG. 5. The first alternative embodiment lacks the above described search template unit and the associated logic element database.

Figure 20:
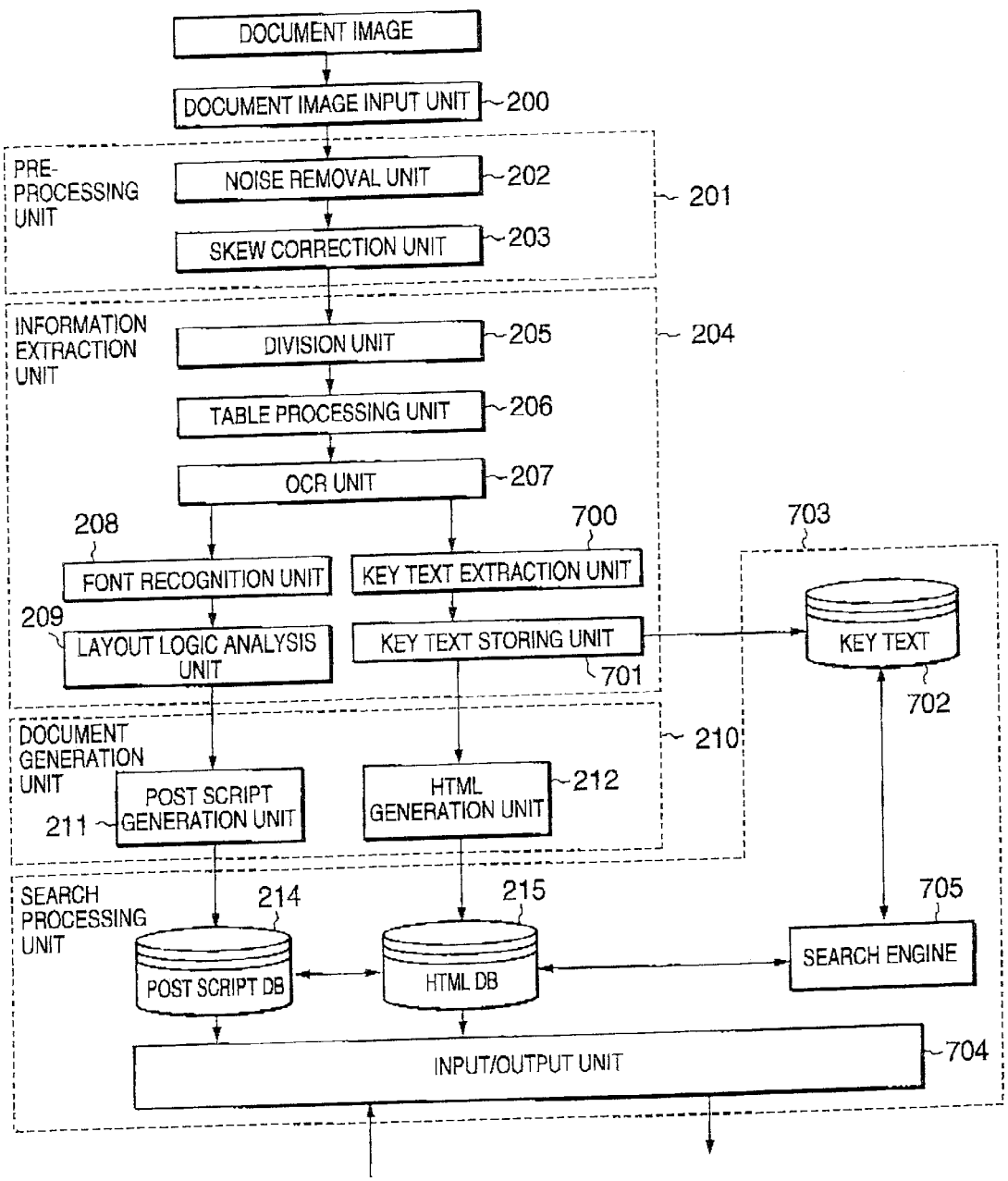
FIG. 20 illustrates a second alternative embodiment of the system for generating user-defined search templates according to the current invention.

Now referring to FIG. 20, a second alternative embodiment of the system for generating user-defined search templates according to the current invention is illustrated in a diagram. All of the components of the second alternative embodiment except for the key text related elements are substantially identical to those of a preferred embodiment as shown in FIG. 5. The key text elements include a key text storing unit 701, a key text database 702 and a search engine 705. In order to efficiently search the information, a key text extraction unit 700 extracts a predetermined set of key text or key words in optically character recognized data. The key text includes a summary, an abstract, a chapter title, a header, a footer. The key text also includes a legend, a figure number, and a text portion associated with the figures. In certain circumstances, the key text extraction unit 700 extracts the above described key text information based upon layout information. A key text storing unit 703 stores the extracted key words in a key text database 702 while the key words are associated with or linked to corresponding portions of Post script database 214 and or HTML database 215. A search engine 705 receives a search request for searching in the key word database and retrieving the associated or linked portions in Post Script and or HTML databases.

Figure 21:
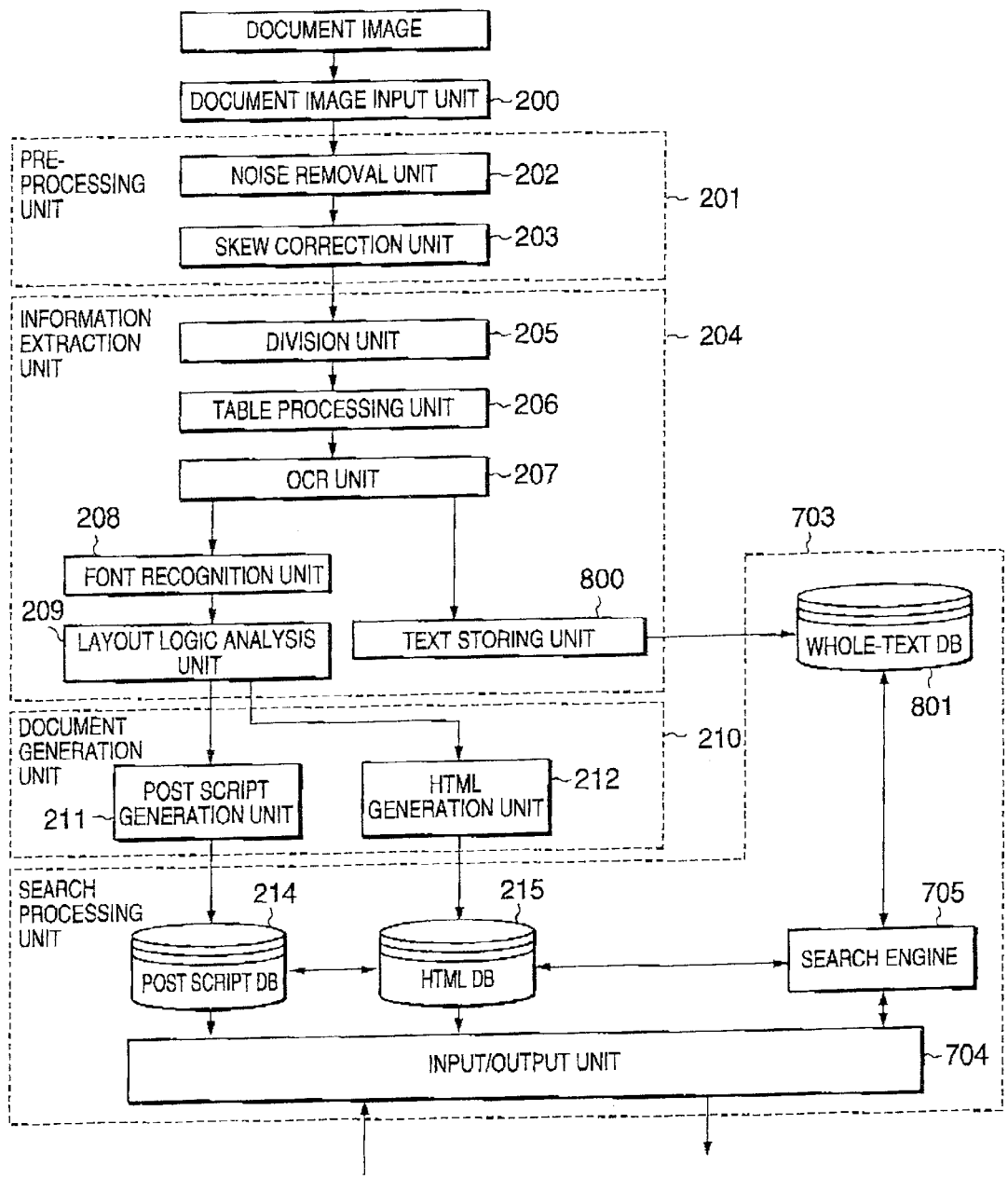
FIG. 21 illustrates a third alternative embodiment of the system for generating user-defined search templates according to the current invention.

Referring to FIG. 21, a third alternative embodiment of the system for generating user-defined search templates according to the current invention is illustrated in a diagram. All of the components of the third alternative embodiment except for the whole text related elements are substantially identical to those of a preferred embodiment as shown in FIG. 5. The whole text elements include a text storing unit 800, a whole text database 901 and a search engine 705. The text storing unit 800 stores all of the optically recognized characters in the whole text database 801. This allows a search engine 705 to perform an exhaustive and efficient text search in the text area without opening and closing multiple files. The text storing unit 800 also relates certain portion of the entire text to the data in other databases including Post Script database 214 and HTML database 215.

Figure 22:
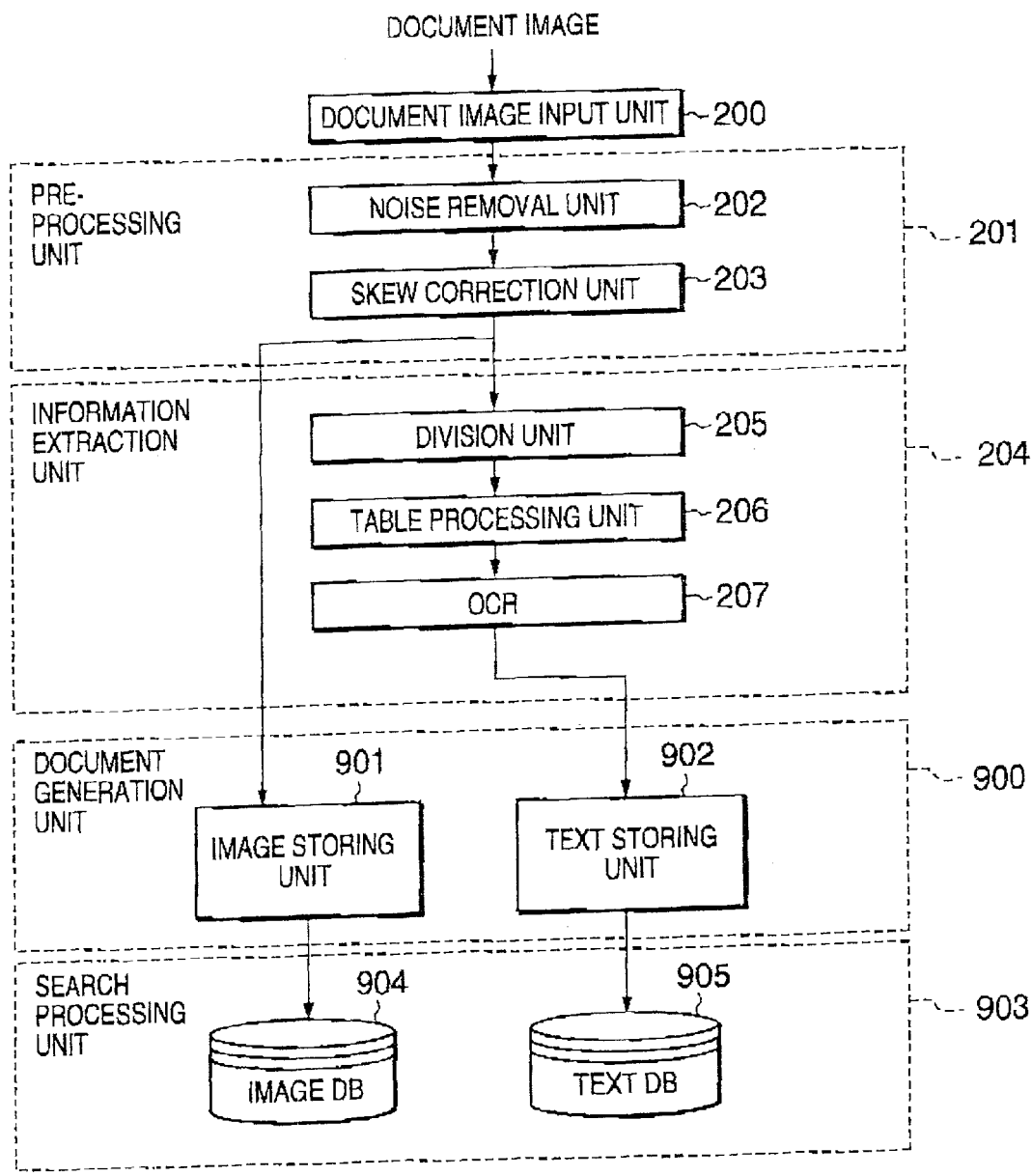
FIG. 22 illustrates a fourth alternative embodiment of the system for generating user-defined search templates according to the current invention.

Referring to FIG. 22, a fourth alternative embodiment of the system for generating user-defined search templates according to the current invention is illustrated in a diagram. Some of the components of the fourth alternative embodiment are substantially identical to those of a preferred embodiment as shown in FIG. 5. The fourth alternative embodiment ultimately generates a text database 905 and an image database 904. After the pre-processing of the inputted image data, the image data storing unit 901 stores the pre-processed inputted image data in the image database unit 904. On the other hand, an information extraction unit 204 generates text data finally via an optical recognition unit 207, and the text database storing unit 902 stores the text data in the text database unit 905. Certain portion of the text data and the image data are connected as they are stored. Since images such as a figure, a diagram, a table and a photograph are stored separately, the images are efficiently retrieved for display.

Figure 23:
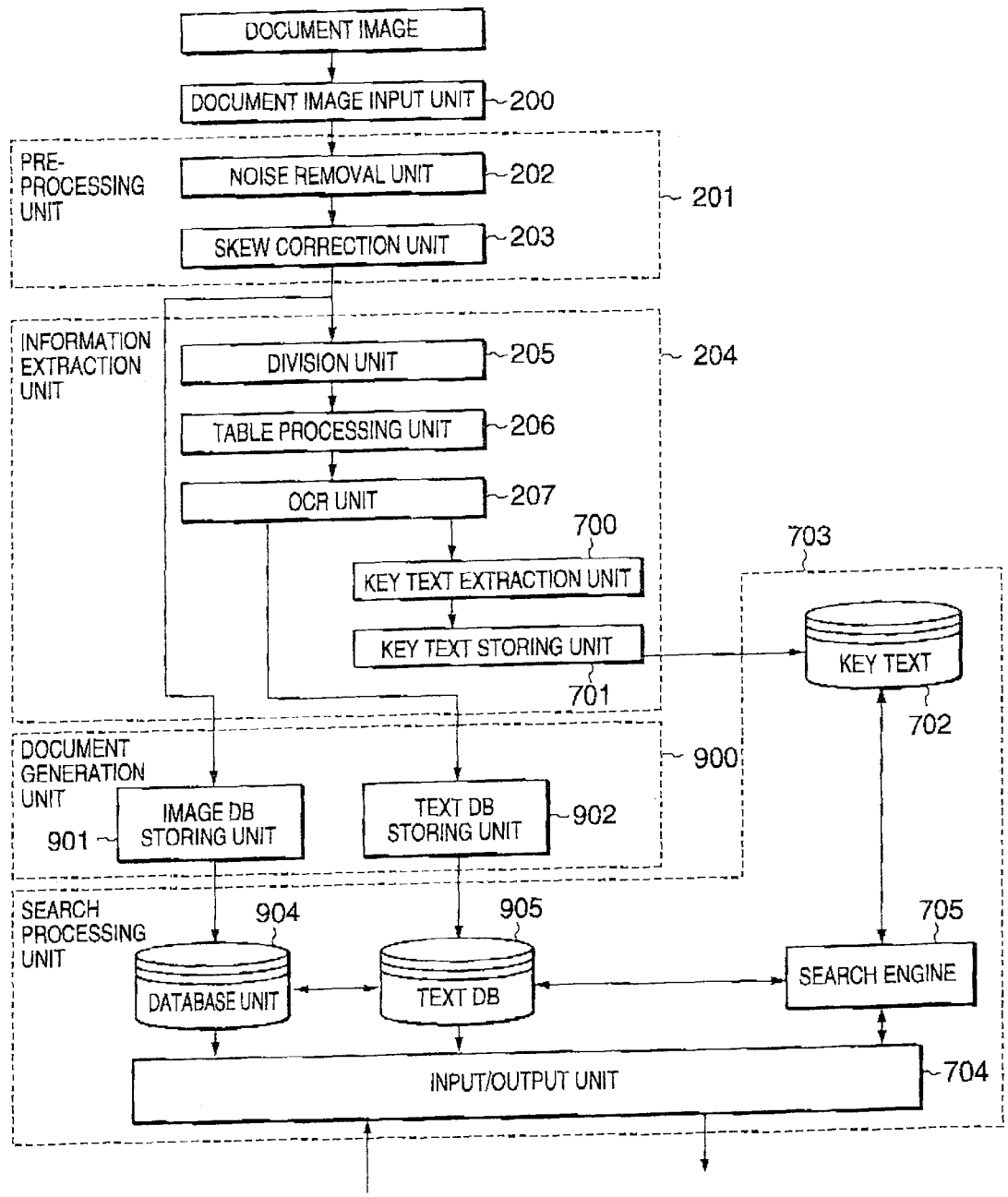
FIGS. 23 and 24 respectively illustrate a fifth and a sixth alternative embodiments of the system for generating user-defined search templates according to the current invention.
Figure 24:
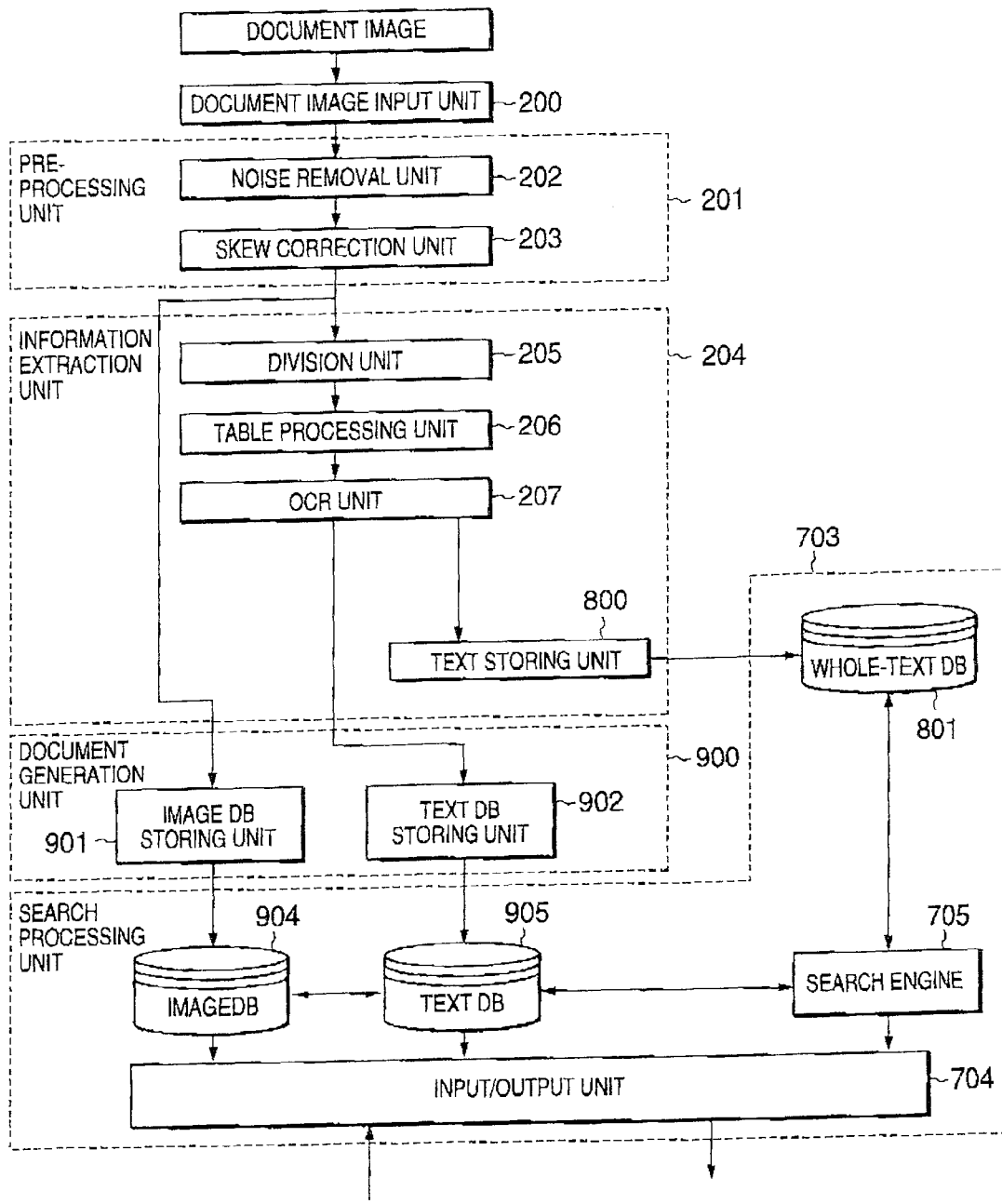

Now referring to FIGS. 23 and 24, a fifth and a sixth alternative embodiments of the system for generating user-defined search templates according to the current invention is illustrated in a diagram. The fifth and the sixth alternative embodiments respectively include a key text database and an entire text database in addition to the components of the fourth alternative embodiment. To generate the additional databases, the fifth and six alternative embodiments respectively further include the key text related units 700 and 701 and the whole text related unit 800. As discussed above, the additional databases are each associated to other databases including the Post Script and HTML databases as they are generated and stored.

Figure 25:
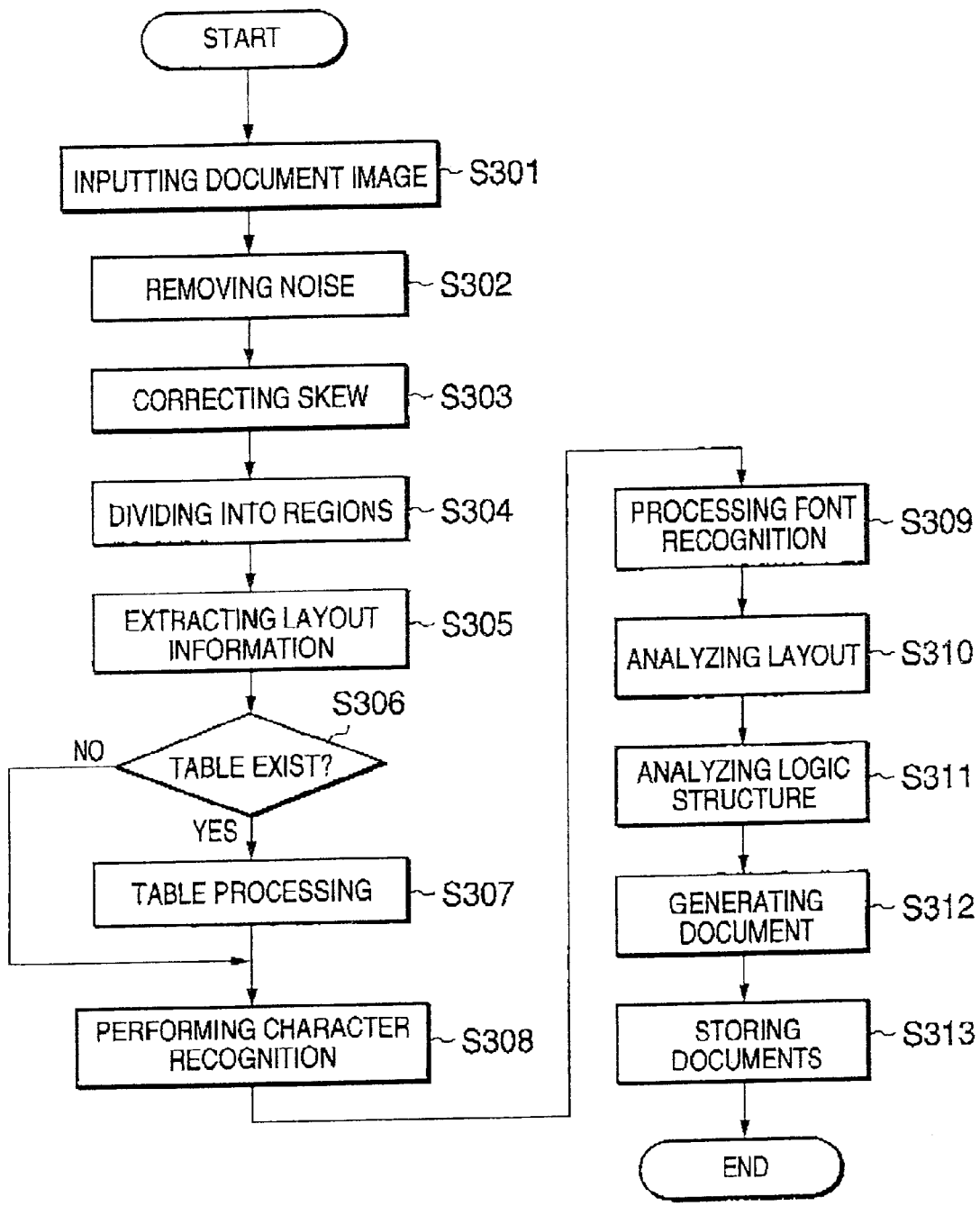
FIG. 25 is a flow chart illustrating steps of a preferred process of generating a database according to the current invention.

Lastly, referring to FIG. 25, steps of a preferred process of generating a database according to the current invention are illustrated in a flow chart. After an document image is inputted in a step S301, a pre-processing takes place to remove noise in a step S302 and to correct skew in a step S303. The pre-processed document image is then divided into areas in a step 304, and layout information or characteristics are extracted in a step S305. It is determined whether or not a table exists in a step 306. If it does, the table is processed in a step 307. On the other hand, if no table exists, the process proceeds to a step S308 where characters are optically recognized. A font analysis, an additional layout analysis and a logic analysis are respectively performed in steps S309, S310 and S311. Based upon the results of the above analysis steps, a desired document data is generated in a step S312, and the document data is stored in a corresponding database in a step S313.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, in a network environment or stand alone, the changes are within the principles of the invention to the full extent indicated by the broad general meaning of the terms in which the appended claims are expressed.

What is claimed is:

1. A method of generating a search template for retrieving information from documents, comprising:

inputting a first document;

dividing the first document into areas, said areas including a text area containing text and an image area containing an image;

displaying said areas to an end user;

selecting at least one of said areas based upon a user-defined input, said user-defined input including a label for said selected area;

automatically extracting a set of predetermined original characteristics of said selected area, said predetermined original characteristics including information for directly identifying said selected area at least in one aspect; and storing said user-defined input and said characteristics as a part of the search template.

2. The method of generating a search template according to claim 1 wherein said user-defined input includes a name, location, indentation, a font size, a font type and a number of lines.

3. The method of generating a search template according to claim 1 further comprising:

inputting additional documents which are predetermined and substantially similar to the first document; and determining reliability for correctly extracting each of the selected areas from said additional documents based upon said stored characteristics.

4. The method of generating a search template according to claim 1 wherein the first document is digitized into a document image in said inputting step.

5. The method of generating a search template according to claim 1 wherein the first document is in a predetermined computer data format.

6. The method of generating a search template according to claim 1 wherein said characteristics includes a name, location, indentation, a font size, and a font type.

7. The method of generating a search template according to claim 1 further comprising:

inputting a second document which is predetermined and substantially similar to the first document after said storing step;

specifying a part of said user-defined input which is stored as the search template; and retrieving information from the second document based upon said specified user-defined input and said characteristics.

8. The method of generating a search template according to claim 7 further comprising:

determining whether or not the second document is sufficiently similar to the first document based upon a predetermined rule after the second document is inputted;

rejecting the second document based upon said determining step; and terminating said retrieving step.

9. The method of generating a search template according to claim 1 wherein a plurality of the search templates is stored.

10. The method of generating a search template according to claim 7 wherein one of the search templates is selected to best match the second document.

11. A system for generating a search template for retrieving information from documents, comprising:

an input unit for inputting a first document;

an area dividing unit connected to said input unit for dividing the first document into areas, said areas including a text area containing text and an image area containing an image;

a user selection unit connected to said area dividing unit for displaying said areas to an end user and for selecting at least one of said areas based upon a user-defined input;

a characteristic extraction unit connected to said user selection unit for automatically extracting a set of predetermined original characeristics for said selected areas, said predetermined original characteristics including information for directly identifying said selected area at least in one aspect; and a storage unit connected to said user selection unit and said characteristic extraction unit for storing said predetermined characteristics and said user-defined input as a part of the search template.

12. The system for generating a search template according to claim 11 wherein said user-defined input includes a name, location, indentation, a font size, a font type and a maximum number of lines.

13. The system for generating a search template according to claim 11 further comprising:

a reliability determination unit connected to said input unit for processing additional documents which are sufficiently similar to the first documents so as to determine reliability of each of the areas.

14. The system for generating a search template according to claim 11 wherein said input unit digitizes the first document into a document image.

15. The system for generating a search template according to claim 11 wherein the first document is in a predetermined computer data format.

16. The system for generating a search template according to claim 11 wherein said characteristics includes a name, location, indentation, a font size, and a font type.

17. The system for generating a search template according to claim 11 wherein said input unit inputs a second document which is sufficiently similar to the first document, and further comprising:

a search process unit connected to said input unit and said storage unit for specifying a part of said user-defined input which is stored as the search template and for retrieving information from the second document based upon said specified user-defined input and said characteristics.

18. The system for generating a search template according to claim 17 wherein said search process unit determines whether or not the second document is sufficiently similar to the first document based upon a predetermined rule and generates a determination result signal, said search process unit rejecting the second document based upon said determination result signal.

19. The system for generating a search template according to claim 11 wherein said storage unit stores a plurality of the search templates.

20. The method of generating a search template according to claim 17 wherein said search process unit selects one of the search templates which best matches the second document.

21. A recording medium containing a computer program for generating a search template for retrieving information from documents, the computer program comprising the steps of:

inputting a first document;

dividing the first document into areas, said areas including a text area containing text and an image area containing an image;

displaying said areas to an end user;

selecting at least one of said areas based upon a user-defined input;

providing a set of predetermined original user-defined input and predetermined characteristics for said selected areas, said user-defined input including a label for the said selected areas, said predetermined original characteristics including information for directly identifying said selected area at least in one aspect;

storing said predetermined set of said user-defined input and said characteristics as a part of the search template;

inputting a second document which is predetermined and substantially similar to the first document after said storing step; and retrieving information from the second document based upon said specified user-defined input and said characteristics.

* * * * *